(12) United States Patent
Takahata

(10) Patent No.: US 11,428,980 B2
(45) Date of Patent: Aug. 30, 2022

(54) DISPLAY SYSTEM

(71) Applicant: Japan Display Inc., Tokyo (JP)

(72) Inventor: Masashi Takahata, Tokyo (JP)

(73) Assignee: Japn Display Inc., Tokyo (JP)

(*) Notice: Subject to any disclaimer, the term of this patent is extended or adjusted under 35 U.S.C. 154(b) by 0 days.

(21) Appl. No.: 17/510,912

(22) Filed: Oct. 26, 2021

(65) Prior Publication Data

US 2022/0128859 A1  Apr. 28, 2022

(30) Foreign Application Priority Data

Oct. 28, 2020  (JP) .............................. JP2020-180898

(51) Int. Cl.
*G02F 1/1335* (2006.01)
*G02F 1/13357* (2006.01)
*G02F 1/1333* (2006.01)

(52) U.S. Cl.
CPC .. *G02F 1/133553* (2013.01); *G02F 1/133314* (2021.01); *G02F 1/133536* (2013.01); *G02F 1/133603* (2013.01)

(58) Field of Classification Search
None
See application file for complete search history.

(56) References Cited

U.S. PATENT DOCUMENTS

2013/0182197 A1* 7/2013 Ludewig ............ G02B 27/0101
349/11

FOREIGN PATENT DOCUMENTS

WO  WO2017061000 A1  4/2017

* cited by examiner

*Primary Examiner* — Phu Vu
(74) *Attorney, Agent, or Firm* — K&L Gates LLP

(57) ABSTRACT

A display system in an embodiment according to the present invention includes a display panel, a backlight located at a back surface side of the display panel and that emits light toward the display panel, a reflective panel located at a front surface side of the display panel and having a light receiving surface inclined obliquely in a direction perpendicular to an optical axis of the backlight, and a magnifying mirror disposed at a position where a reflected light from the reflective panel is received. The reflective panel includes a reflection region and a transmission region in the light receiving surface, and a position and a size of the reflection region and the transmission region are variable.

12 Claims, 22 Drawing Sheets

DISPLAY SYSTEM

CROSS-REFERENCE TO RELATED APPLICATIONS

This application is based upon and claims the benefit of priority from the prior Japanese Patent Application No. 2020-180898, filed on Oct. 28, 2020, the entire contents of which are incorporated herein by reference.

FIELD

An embodiment of the present invention relates to a display system for displaying a virtual image in a user's field of view.

BACKGROUND

A display system has been developed in which an image displayed on a liquid crystal panel is reflected in a mirror and projected as a virtual image beyond the windshield of an automobile. Such a display system is also called a head-up display. For example, the specification of WO2017/061000 discloses a head-up display including an image projection unit (a liquid crystal display device) for projecting an image to be displayed as a virtual image, a dimming mirror film for reflecting the image projected by the image projection unit, a control unit for switching the dimming mirror film between a transmissive state and a mirror state, and having a function for projecting the virtual image by setting the dimming mirror film to the mirror state by the control unit and interrupting the irradiation of external light to the image projection unit by switching to the transmissive state.

SUMMARY

A display system in an embodiment according to the present invention includes a display panel, a backlight located at a back surface side of the display panel and irradiating light on the display panel, a reflective panel located at a front surface side of the display panel and having a light receiving surface inclined obliquely in a direction perpendicular to an optical axis of the backlight, and a magnifying mirror located at a position where a reflected light from the reflective panel is received. The reflective panel includes a reflection region and a transmission region in the light receiving surface, and a position and a size of the reflection region and the transmission region are variable.

A display system in an embodiment according to the present invention includes a display panel displaying images, a backlight emitting light from a back surface side of the display panel, a reflective panel having a light receiving surface on which an image displayed on the display panel is projected, and a magnifying mirror for projecting the images projected on the reflective panel to a projection port. The reflective panel includes a reflection region and a transmission region in the light receiving surface, and a position and a size of the reflection region and the transmission region are variable.

DESCRIPTION OF EMBODIMENTS

Figure 1:
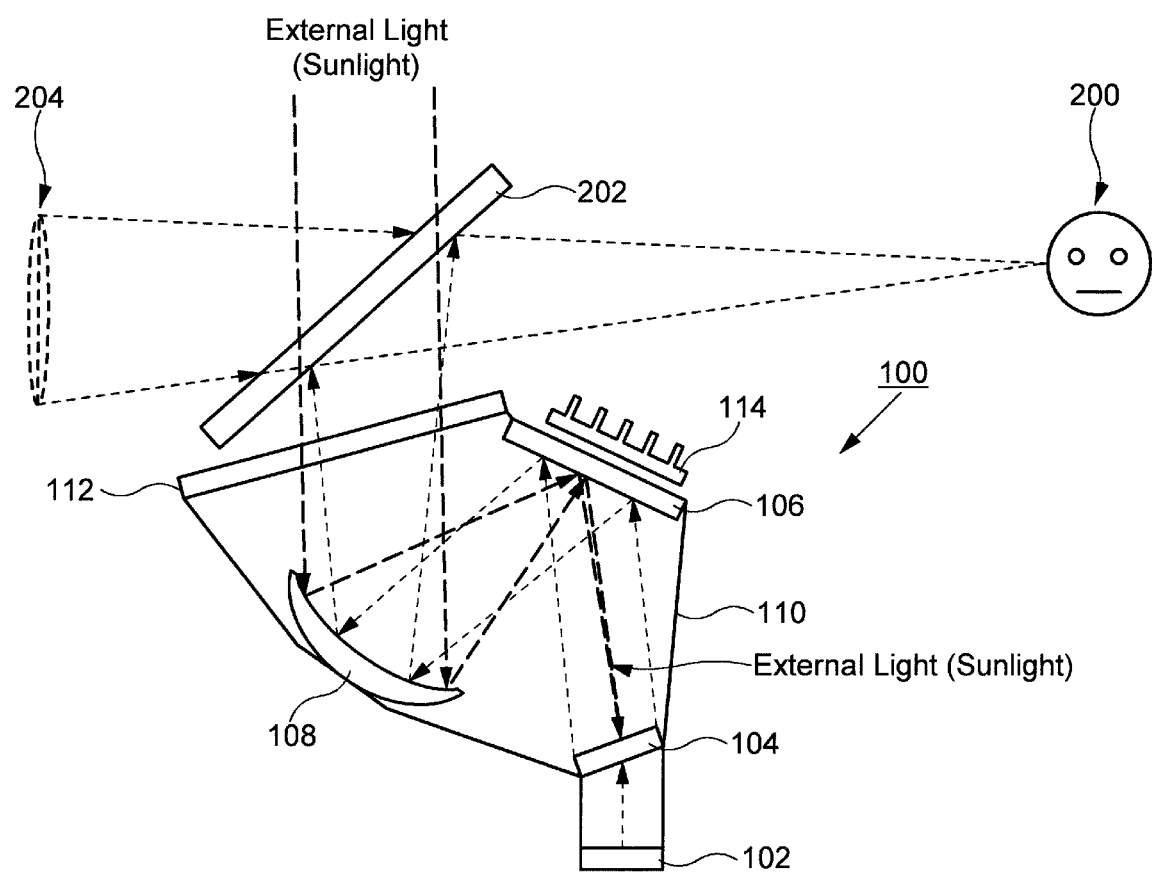
FIG. 1 schematically shows a configuration of a display system according to an embodiment of the present invention.

A head-up display is used for a motorcycle, an automobile or other vehicle, a ship, an aircraft, etc. In such an application, the head-up display may be used under sunlight, in which case it is necessary to increase the luminance of the image projection unit in order to display a virtual image. The image projection unit is composed of, for example, a liquid crystal panel and a backlight as a display panel, but when the luminance of the backlight is increased, there are problems such as display failure and degradation of the liquid crystal panel due to the temperature increase.

The head-up display has a phenomenon whereby an image cannot be displayed because the incident angle of sunlight causes sunlight to be condensed by an optical system inside the head-up display, and the sunlight irradiates the liquid crystal panel which heats the liquid crystal to a temperature exceeding the phase transition temperature. Such a phenomenon becomes remarkable when the range for displaying the virtual image is expanded, and it becomes a factor inhibiting the promotion of the commercialization and the popularization of the head-up display.

The following configurations of the display system according to one embodiment of the present invention can overcome the various problems described above.

Hereinafter, embodiments of the present invention will be described with reference to the drawings and the like. The present invention may be carried out in various forms without departing from the gist thereof, and is not to be construed as being limited to any of the following embodiments. Although the drawings may schematically represent the width, thickness, shape, and the like of each part in comparison with the actual embodiment in order to clarify the description, they are merely examples and do not limit the interpretation of the present invention. In the present specification and each of the figures, elements similar to those described previously with respect to the figures already mentioned are designated by the same reference numerals (or numbers followed by a, b, etc.), and a detailed description thereof may be omitted as appropriate. Furthermore, the characters "first" and "second" appended to each element are convenient signs used to distinguish each element, and have no further meaning unless specifically described.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

1. Configuration of Display System

FIG. 1 schematically shows a display system 100 according to an embodiment of the present invention. The display system 100 includes a backlight 102, a display panel 104, a reflective panel 106, and a magnifying mirror 108. These members are housed in a housing 110. The housing 110 is formed of a light shielding member. The housing 110 is disposed with a projection port 112 through which light projected by the magnifying mirror 108 passes. The projection port 112 is arranged at a position where the image displayed on the display panel 104 is projected to the outside through the reflective panel 106 and the magnifying mirror 108.

The display panel 104 illustrated in this embodiment is a transmissive liquid crystal panel and has a display part (not shown) composed of a plurality of pixels. The backlight 102 is located on a back surface side of the display panel 104. The image displayed on the display part of the display panel 104 is projected on the reflective panel 106 by the light of the backlight 102.

The reflective panel 106 is located at a position where the image displayed on the display panel 104 is projected. In other words, the reflective panel 106 is located at a front surface side of the display panel 104, and a light receiving surface is located so as to be inclined in a direction perpendicular to the optical axis (normal direction with respect to the light emitting surface) of the backlight 102. The image displayed on the display panel 104 projected on the reflective panel 106 is projected on the magnifying mirror 108 by such an arrangement.

The reflective panel 106 has a function for forming a reflection region and a transmission region on the light-receiving surface. The light receiving surface of the reflective panel 106 and the display part of the display panel 104 are not disposed facing each other, but the light receiving surface of the reflective panel 106 is disposed diagonally at a predetermined angle. That is, the reflective panel 106 is disposed at the predetermined angle so that light (projected image) emitted to the light receiving surface is not reflected toward the display panel 104 but is reflected toward the magnifying mirror 108. The light receiving surface of the reflective panel 106 has a flat plate shape, and it is possible to control a part of a region in the light receiving surface as the reflection region and the other region as the transmission region. The reflective panel 106 has a function for reversibly converting a part of a region of the light receiving surface into the reflection region and a region other than the reflection region into the transmission region.

The magnifying mirror 108 is located at a position where reflected light of the reflective panel 106 is received. A concave mirror is used as the magnifying mirror 108, for example. The magnifying mirror 108 is disposed at an angle to reflect light incident from the reflective panel 106 to the projection port 112.

The display system 100 is configured to project the image displayed on the display panel 104 from the projection port 112 to the outside by arranging the reflective panel 106, the magnifying mirror 108 on the backlight 102, and the display panel 104 as described above. The display system 100 is attached to a motorcycle, an automobile or other vehicle, a ship, an aircraft, etc., or a motorcycle helmet, etc.

FIG. 1 shows an example in which the display system 100 is disposed to project the image onto the windshield 202 of a vehicle. The display system 100 projects the image displayed on the display panel 104 toward the windshield 202 and reflects the image by the windshield 202 to project a virtual image 204. The user 200, (for example, a driver of a vehicle) can view the virtual image formed in front of the windshield 202 by the display system 100. The display system 100 allows the driver of the vehicle to view a forward view or the virtual image through the windshield 202 without significantly moving his or her line of sight. If the vehicle is an automobile, the projection port 112 is arranged in the dust cover. The projection port 112 may be arranged with a window formed of a transparent resin, glass, or the like.

The display system 100 is also referred to as the head-up display (HUD). Although FIG. 1 illustrates the windshield 202, one embodiment of the present invention is not limited thereto, and may be the windshield attached to a motorcycle or helmet, or a half mirror for forming the virtual image 204.

The display system 100 has the projection port 112 directed to the side of the windshield 202, so that external light enters the inside of the housing 110 through the projection port 112. For example, sunlight may enter the interior of the housing 110 through the windshield 202 and the projection port 112, depending on the environment in which the display system 100 is used. In this case, a phenomenon occurs in which the external light condensed by the magnifying mirror 108 is reflected by the reflective panel 106 to irradiate the display panel 104, depending on the incident angle of the external light.

The temperature of the liquid crystal is increased when the display panel 104 is irradiated with high energy density light such as sunlight. The liquid crystal is heated to a phase transition temperature or higher, the alignment of the liquid crystal molecules is disturbed, and a display failure occurs on the display panel 104. For example, the display panel 104 has a phenomenon in which a part or the whole of the display part is displayed in black regardless of the video signal.

2. Reflective Panel

Figure 2A:
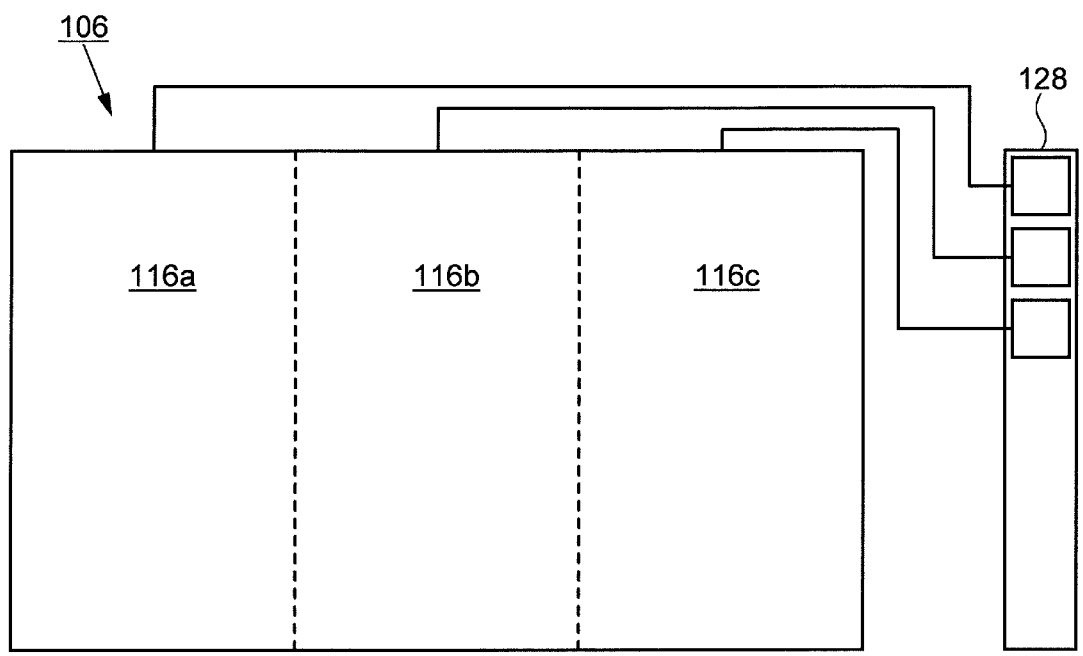
FIG. 2A shows an example of a reflective panel applied to a display system according to an embodiment of the present invention in which a light receiving surface is divided into three parts.

The reflective panel 106 has a function for appropriately changing the range in which light is reflected on the light receiving surface in order to prevent such a phenomenon. For example, as shown in FIG. 2A, the reflective panel 106 includes divided regions 116a, 116b, 116c in which the light receiving surface is divided into three. The divided regions 116a, 116b, 116c are reversibly controlled by a reflective panel control unit 128 to individually reflect and transmit the respective regions. The divided regions 116a, 116b, 116c can be individually controlled. For example, the reflective panel 106 is controlled so that the divided regions 116a, 116c are in a transmissive state and the divided region 116b is in a reflective state. Each of the divided regions 116a, 116b, 116c becomes the reflection region when controlled to the reflective state, and becomes the transmission region when controlled to the transmissive state.

The reflective panel 106 is located to reflect the image displayed on the display panel 104 to the magnifying mirror. Therefore, the reflective panel 106 reflects the external light and irradiates the display panel 104 when the external light enters the display panel 104 in a reverse path to the projection of the image. The display panel 104 is irradiated with all of the external light condensed by the magnifying mirror 108 when the entire surface of the reflective panel 106 is controlled to the reflective state. Although the display panel 104 can be prevented from being irradiated with external light when the entire surface of the light receiving surface of the reflective panel 106 is in the transmissive state, the display panel 104 cannot project the image. The images displayed on the display panel 104 include images that are not displayed on the entire display screen. In such a case, the display system 100 has a function for controlling a part of the reflective panel 106 as the reflection region and the other part of the reflective panel as the transmission region. That is, the display system 100 has a function for controlling a region where the image of the display panel 104 of the reflective panel 106 is allocated as the reflection region and other regions as the transmission region. Even when the reflective panel 106 makes only a region necessary for display as the reflection region and controls other regions as the transmission region, the projection of the image is not affected at all. Instead, it is possible for the display system 100 to improve the contrast of the projected image by using a part of the reflective panel 106 as the reflection region and the other region as the transmission region.

Even when external light is incident to the display system 100, when a part of the light receiving surface of the reflective panel 106 is the reflection region and the other region is the transmission region, the quantity of external light incident to the display panel 104 can be reduced as compared with the case where the entire surface of the light receiving surface is the reflection region. As a result, the increase in temperature of the display panel 104 due to external light incidence is suppressed, and display failure can be prevented.

The reflective panel 106 may be driven to have a period during which the reflection region is formed and a period during which the entire surface of the light receiving surface is the transmission region within a display period of one frame on the display panel 104. For example, the reflective panel 106 may be driven so that a part or the whole of the light receiving surface is the reflection region in half of the frame period (½ frame period) within one frame period, and the entire surface of the light receiving surface is the transmission region in the remaining frame period. In this way, it is possible to reduce the integrated light quantity of the external light incident to the display panel 104 even when the external light is incident by providing a period in which the entire surface of the light receiving surface becomes the transmission region within one frame period.

Figure 2B:
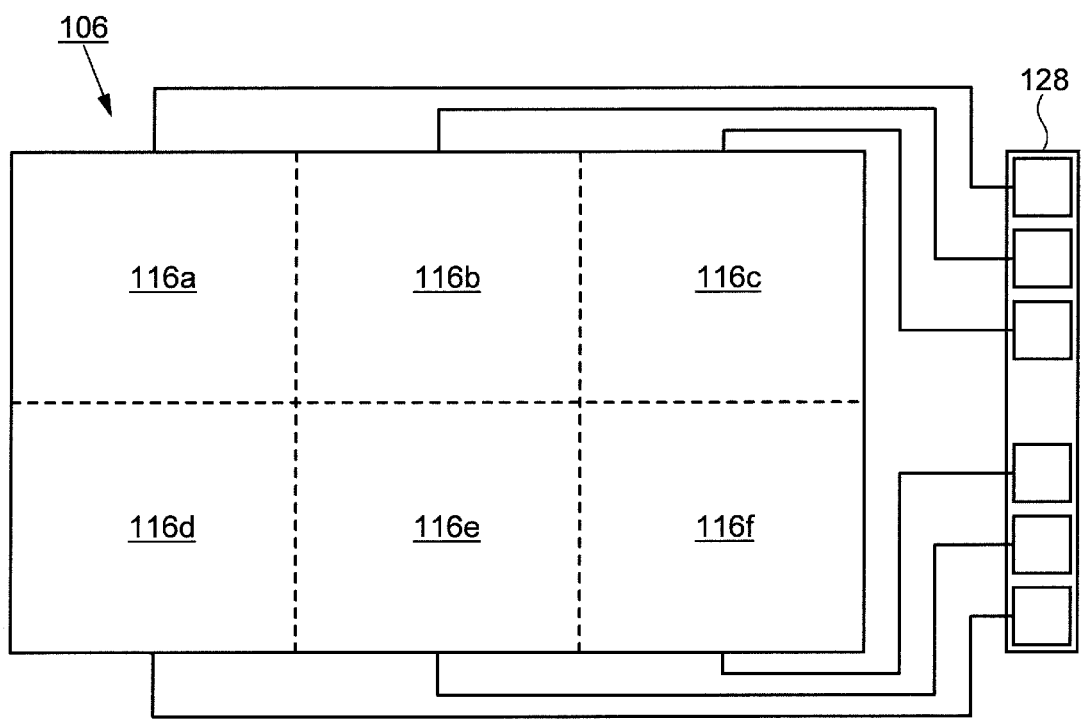
FIG. 2B shows an example of a reflective panel applied to a display system according to an embodiment of the present invention in which the light receiving surface is divided into six parts.

The number of divisions of the light receiving surface of the reflective panel 106 is arbitrary, for example, six divided regions 116a, 116b, 116c, 116d, 116e, 116f may be arranged, as shown in FIG. 2B. It is possible to control the range of the transmission region and the reflection region more precisely by subdividing the divided region. The number and size of the divided regions of the reflective panel 106 need not be the same as the number of divisions of the backlight that is division driven. The number of divided regions of the reflective panel 106 may be smaller than the number of divided regions in the divided driven regions of the backlight.

Figure 3A:
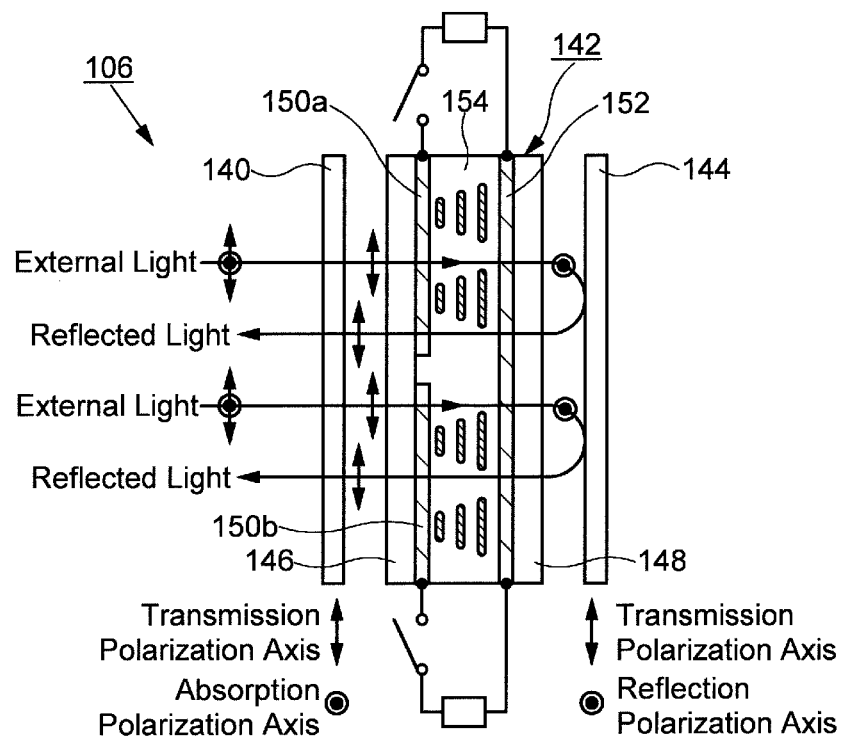
FIG. 3A shows an example of the structure and operation of a reflective panel applied to a display system according to an embodiment of the present invention in which a reflection region is formed on the entire surface of a light receiving surface.

FIG. 3A shows an example of a cross-sectional schematic structure of the reflective panel 106. The reflective panel 106 shown in FIG. 3A has a configuration in which an absorption polarization unit (an absorption polarization plate) 140, a transmission polarization axis conversion unit 142, and a reflection polarization unit (a reflection polarization plate) 144 are disposed from the light receiving surface side. FIG. 3A shows, for the purposes of illustration, the parts disposed with gaps, but in actuality, the parts are disposed close to or very close to each other.

The absorption polarization unit 140 has a transmission polarization axis in a first direction (vertical direction in the diagram) and an absorption polarization axis in a second direction (perpendicular) perpendicular to the first direction. The absorption polarization unit 140 transmits a linearly polarized component in the first direction (hereinafter also referred to as a "first linearly polarized component") and absorbs a linearly polarized component in the second direction (hereinafter also referred to as a "second linearly polarized component"). As shown in FIG. 3A, the light of the first linear polarized component is transmitted and the light of the second linear polarized component is not transmitted but is absorbed, when external light enters the absorption polarization unit 140. The absorption polarization unit 140 may be formed of a polarization plate or a polarization film having an absorption polarizer.

The transmission polarization axis conversion unit 142 may have at least two states, a state in which the polarization axis of the incident light changes and a state in which the polarization axis does not change. Specifically, the transmission polarization axis conversion unit 142 may have a state in which the polarization direction of light linearly polarized in one direction is rotated by 90 degrees and a state in which the polarization direction is not rotated. These functions of the transmission polarization axis conversion unit 142 are realized by the electro-optical effect of the liquid crystal.

The transmission polarization axis conversion unit 142 includes a first substrate 146 disposed with first transparent electrodes 150*a*, 150*b*, a second substrate 148 disposed with a second transparent electrode 152, and a liquid crystal layer 154. The first substrate 146 and the second substrate 148 are disposed to face the first transparent electrodes 150*a*, 150*b* and the second transparent electrode 152 with a gap, and the liquid crystal layer 154 is disposed in the gap.

A voltage is applied between the first transparent electrodes 150*a*, 150*b* and the second transparent electrode 152 of the transmission polarization axis conversion unit 142. The voltage applied to the liquid crystal layer 154 by the first transparent electrodes 150*a*, 150*b* and the second transparent electrode 152 is preferably a voltage which has a polarity which is periodically inverted to prevent deterioration of the liquid crystal layer 154. Although not shown in FIG. 3A, alignment films for aligning liquid crystal molecules are disposed on the surfaces of the first transparent electrodes 150*a*, 150*b* and the second transparent electrode 152.

Glass substrates are used for the first substrate 146 and the second substrate 148, and the first transparent electrodes 150*a*, 150*b* and the second transparent electrode 152 are formed of a transparent conductive film such as indium tin oxide (ITO). The liquid crystal layer 154 is, for example, a twisted nematic liquid crystal. The twisted nematic liquid crystal is aligned such that, when no voltage is applied, the alignment of the liquid crystal molecules between the first transparent electrodes 150*a*, 150*b* and the second transparent electrode 152 is twisted by 90 degrees while gradually rotating in one direction to have chirality.

Figure 3B:
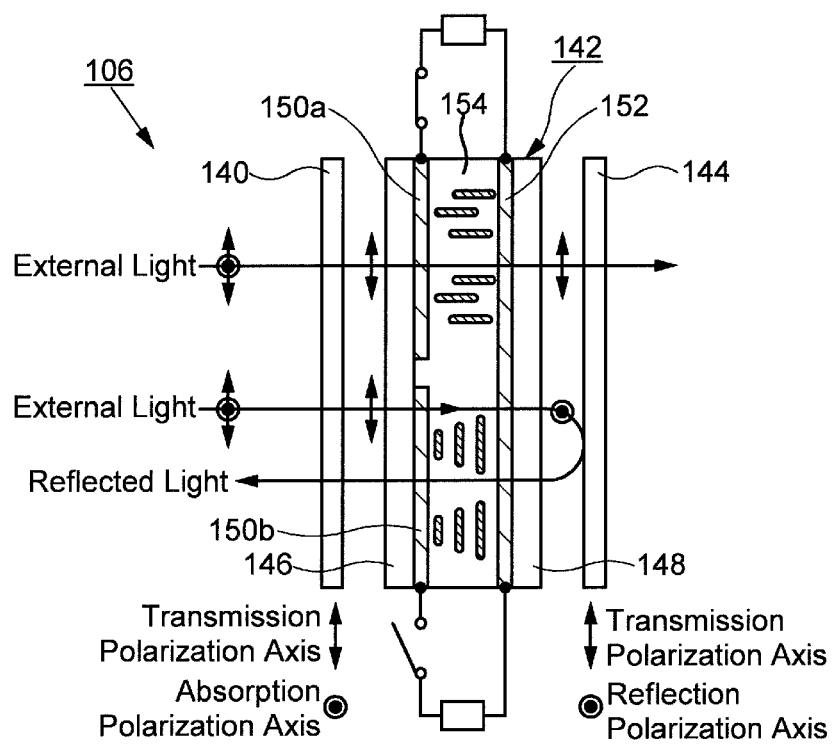
FIG. 3B shows the structure and operation of a reflective panel applied to a display system according to an embodiment of the present invention, in which a transmission region is formed in a part of a light receiving surface and a reflection region is formed in another part of the light receiving surface.

As shown in FIG. 3B, when a voltage is applied between the first transparent electrode 150*a* and the second transparent electrode 152, the liquid crystal molecules are aligned in the direction in which the electric field is applied, and the chirality is lost. On the other hand, the liquid crystal molecules are maintained in a chirality state since a voltage is not applied to the first transparent electrode 150*b* and the second transparent electrode 152.

As shown in FIG. 3A, the direction of polarization rotates along the rotation of the liquid crystal molecules when the light of the first linear polarized component is incident to the liquid crystal layer 154 having chirality. The liquid crystal molecules are twisted by 90 degrees, so that the light transmitted through the liquid crystal layer 154 is substantially converted into the light of the second linear polarized component. On the other hand, as shown in FIG. 3B, the polarization axis of the incident light does not change when the light of the first linear polarized component is incident to the liquid crystal layer 154 (the liquid crystal layer between the first transparent electrode 150*a* and the second transparent electrode 152) in which chirality is lost.

The transmission polarization axis conversion unit 142 can control a state in which the polarization axis changes and a state in which the polarization axis does not change when the linearly polarized incident light passes through by an electrical action. That is, it is possible to control the polarization axis of incident light by the voltage applied to the pair of electrodes sandwiching the liquid crystal layer 154. The transmission polarization axis conversion unit 142 has one transparent electrode divided into a plurality of regions (the first transparent electrodes 150*a*, 150*b*), and has a function for controlling the alignment of liquid crystal molecules for each divided region. The number of divided regions in the transmission polarization axis conversion unit 142 is arbitrary, and it is possible to be divided into three regions as shown in FIG. 2A, into six regions as shown in FIG. 2B, and a larger number of divided regions may also be provided.

The reflection polarization unit 144 has the transmission polarization axis in the first direction and the reflection polarization axis in the second direction. The reflection polarization unit 144 transmits the incident light of the first linear polarized component and reflects incident light of the second linear polarized component. For example, the reflection polarization unit 144 having such characteristics may be provided by a polarization plate or polarization film having a wire grid polarizer using metal nanowires.

As shown in FIG. 3A, the incident light having the second linearly polarized light component changed by the transmission polarization axis conversion unit 142 is reflected by the reflection polarization unit 144 and re-enters the transmission polarization axis conversion unit 142. The reflected light re-incident on the transmission polarization axis conversion unit 142 is converted into the light of the first linear polarized component by the liquid crystal layer 154 having chirality, and is emitted from the absorption polarization unit 140. Therefore, the entire surface of the light receiving surface of the reflective panel 106 is the reflection region in the state shown in FIG. 3A.

On the other hand, as shown in FIG. 3B, when the voltage that changes the alignment of the liquid crystal molecules is applied to the first transparent electrode 150*a*, the chirality of the liquid crystal molecules in this region is lost, thereby the light of the first linear polarized component is transmitted through the reflection polarization unit 144 as it is. As a result, the region of the first transparent electrode 150*a* becomes the transmission region and the region of the first transparent electrode 150*b* becomes the reflection region of the reflective panel 106. Although not shown in the figure, when a voltage is also applied to the first transparent electrode 150*b*, it is possible to turn the region of the first transparent electrode 150*b* into a transmission region.

As described with reference to FIG. 3A and FIG. 3B, it is possible for the entire surface of the light receiving surface of the reflective panel 106 is the reflection region or the transmission region, and that part of the light receiving surface is the transmission region and the other parts are the reflection regions. The reflective panel 106 may allocate the transmission region and the reflection region dynamically by electrical control.

Figure 4A:
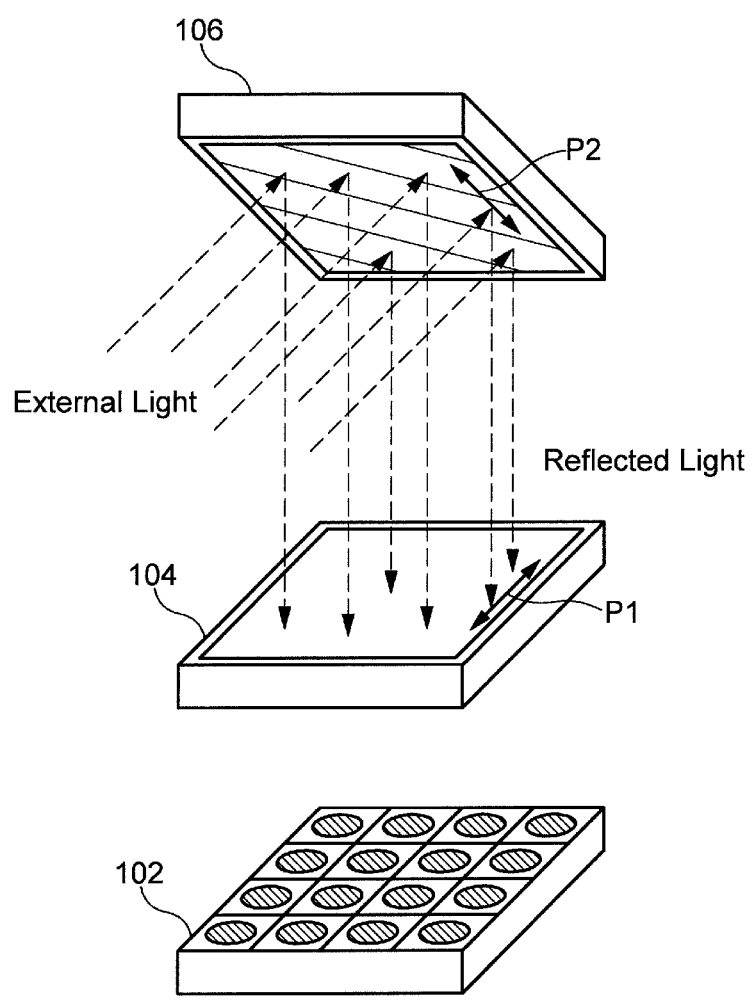
FIG. 4A shows a reflective panel applied to a display system according to an embodiment of the present invention, in which a light receiving surface is entirely a reflection region.

The influence of external light is reduced by using the reflective panel 106 in which the light receiving surface can be appropriately changed into the reflection region and the transmission region. FIG. 4A schematically shows a state in which external light enters when the entire surface of the light receiving surface of the reflective panel 106 is the reflection region. The external light reflected on the entire surface of the light receiving surface of the reflective panel 106 is irradiated to the display panel 104.

An arrow P1 shown in FIG. 4A indicates the direction of the transmission polarization axis of the polarization plate located at the light emitting side of the display panel 104, and an arrow P2 indicates the direction of the transmission polarization axis of the polarization plate located at the light receiving surface of the reflective panel 106 (the absorption polarization unit 140 shown in FIG. 3A). FIG. 4A shows that the direction of the transmission polarization axis of the polarization plate located at the light emission side of the display panel 104 coincides with the direction of the transmission polarization axis of the polarization plate (the absorption polarization unit 140) located at the light receiving surface of the reflective panel 104. Therefore, when the external light enters the reflective panel 104, since the polarization axis of the reflected light coincides with the direction of the transmission polarization axis of the polarization plate located at the light exit side of the display panel 104, the reflected light enters the display panel 104. That is, FIG. 4A shows that the reflected light of the external light reaches the liquid crystal layer through the polarization plate located at the front surface, when the display panel 104 is a liquid crystal panel.

Figure 4B:
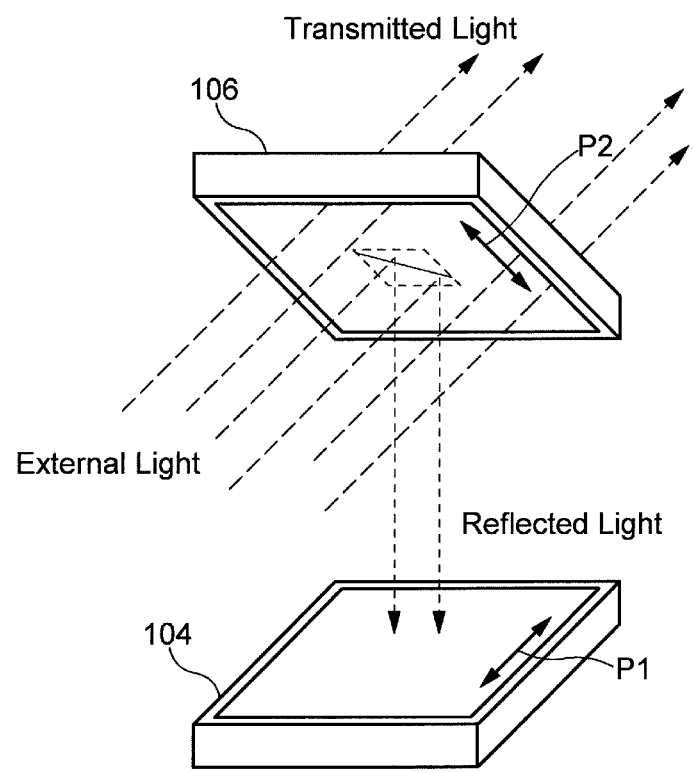
FIG. 4B shows a reflective panel applied to a display system according to an embodiment of the present invention, in which a part of a light receiving surface is a reflection region and the other part of the light receiving surface is a transmission region.

On the other hand, FIG. 4B schematically shows a case where a part of the reflective panel 106 is allocated to be the reflection region and the other regions are allocated to be the transmission region. The external light is transmitted through the transmission region formed on the light receiving surface of the reflective panel 106, and a part of the external light is reflected by the reflection region to irradiate the display panel 104. However, since the region of the reflection region is smaller than in the case shown in FIG. 4A, the amount of external light emitted to the display panel 104 decreases.

As described above, the reflective panel 106 according to the present embodiment makes it possible to reduce the intensity and light quantity of the external light emitted from the display panel 104 even when the external light is incident on the display system 100. For example, the reflective panel 106 being in the transmissive state when the display system 100 is not working makes it possible to prevent the display panel 104 from being irradiated with external light, and it is possible to suppress the temperature rise and prevent the deterioration of the liquid crystal.

Figure 5A:
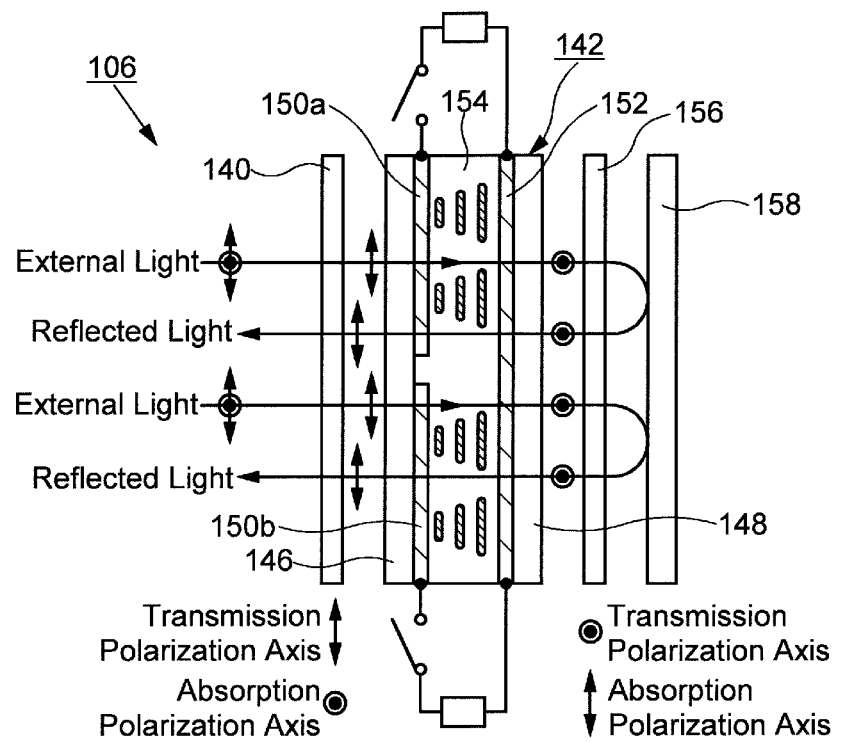
FIG. 5A shows a reflective panel applied to a display system according to an embodiment of the present invention, in which a light receiving surface is formed entirely with a reflection region.

FIG. 5A shows an example of a reflective panel 106 different in structure from that shown in FIG. 3A. The reflective panel 106 shown in FIG. 5A has an absorption polarization unit 156 instead of the reflection polarization unit. The absorption polarization unit 156 located at the back surface side of the transmission polarization axis conversion unit 142 is disposed in a state where the transmission polarization axis is rotated by 90 degrees (cross-Niccol) to the absorption polarization unit 140 located at the light receiving surface side. A reflecting plate (mirror) 158 is located at a back surface side of the absorption polarization unit 156.

When the reflective panel 106 shown in FIG. 5A has chirality in the liquid crystal layer 154, the incident light passes through the absorption polarization unit 156 and is reflected by the reflective plate 158. As a result, the incident light on the light receiving surface of the reflective panel 106 is emitted as reflected light. That is, in the state shown in FIG. 5A, the light receiving surface of the reflective panel 106 is a mirror surface state.

Figure 5B:
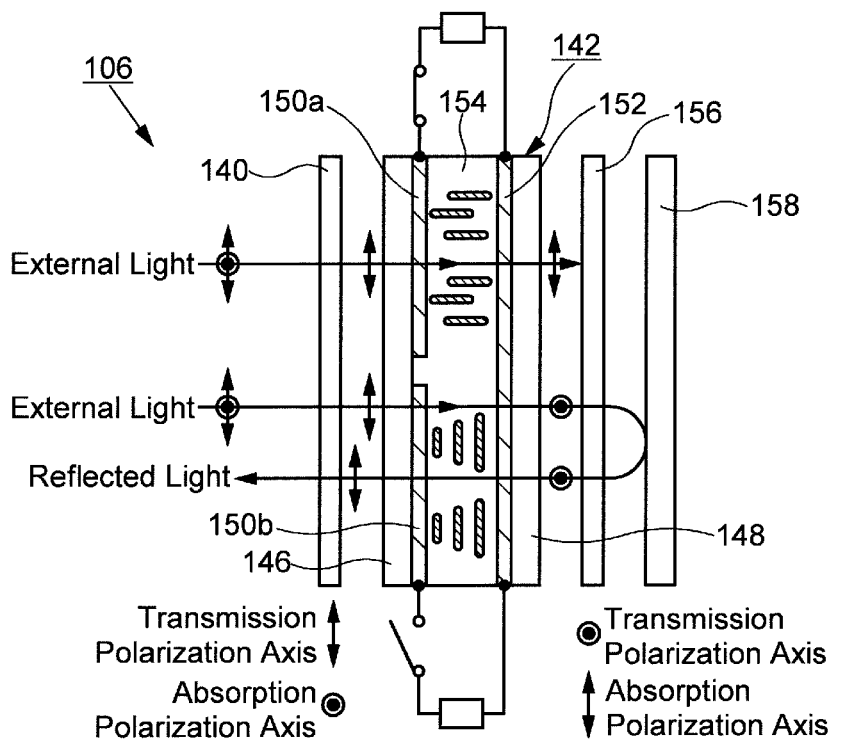
FIG. 5B shows a reflective panel applied to a display system according to an embodiment of the present invention, in which a part of a light receiving surface is formed with a reflection region and the other part of the light receiving surface is formed with a transmission region.

On the other hand, as shown in FIG. 5B, when a voltage is applied to the first transparent electrode 150a of the transmission polarization axis conversion unit 142, the incident light which passed through the region of the first transparent electrode 150a is absorbed by the absorption polarization unit 156 and does not reach the reflective plate 158 because the polarization axis coincides with the absorption polarization axis. Therefore, the region of the first transparent electrode 150a becomes a non-reflection region (black region), and the region of the first transparent electrode 150b becomes the reflection region (mirror surface region).

The reflective panel 106 shown in FIG. 5A is installed in the display system 100, thereby reducing the amount of external light irradiated to the display panel 104 and preventing the temperature rise and the degradation of the liquid crystal.

Although FIG. 3A and FIG. 5A show the liquid crystal in the state of being twisted (the state of having chirality) when the power is turned off and in the state of being untwisted (the state of losing chirality) when the power is turned on, the liquid crystal applicable to the reflective panel 106 is not limited thereto. In contrast, the liquid crystal may be applied to the reflective panel 106 in the state of being untwisted (the state of losing chirality) when the power is turned off and in the state of being twisted (the state of having chirality) when the power is turned on.

As shown in FIG. 1, a heatsink 114 may be disposed on the back surface side of the reflective panel 106. The temperature rise can be reduced when the reflective panel 106 is irradiated with external light, by disposing the heatsink 114.

Note that although the present embodiment shows the device utilizing the electro-optical effect of the liquid crystal as the reflective panel 106, the reflective panel applicable to one embodiment of the present invention is not limited thereto. It is possible to apply an electronic mirror, a digital micromirror (DMD), a mirror display, or the like as the reflective panel 106, to achieve the same function.

3. Display Panel

The display system 100 shown in FIG. 1 is not limited to the display panel 104 type. Various display panels can be used, such as IPS (In-Plane Switching), VA (Vertical Alignment), TN (Twisted Nematic), etc. There is no limitation to a circuit substrate called a backplane for driving the liquid crystal element, and an active matrix circuit substrate made of an amorphous silicon TFT (thin film transistor), a polycrystalline silicon TFT, an oxide semiconductor TFT, or the like, or a passive matrix circuit substrate can be used.

Figure 6:
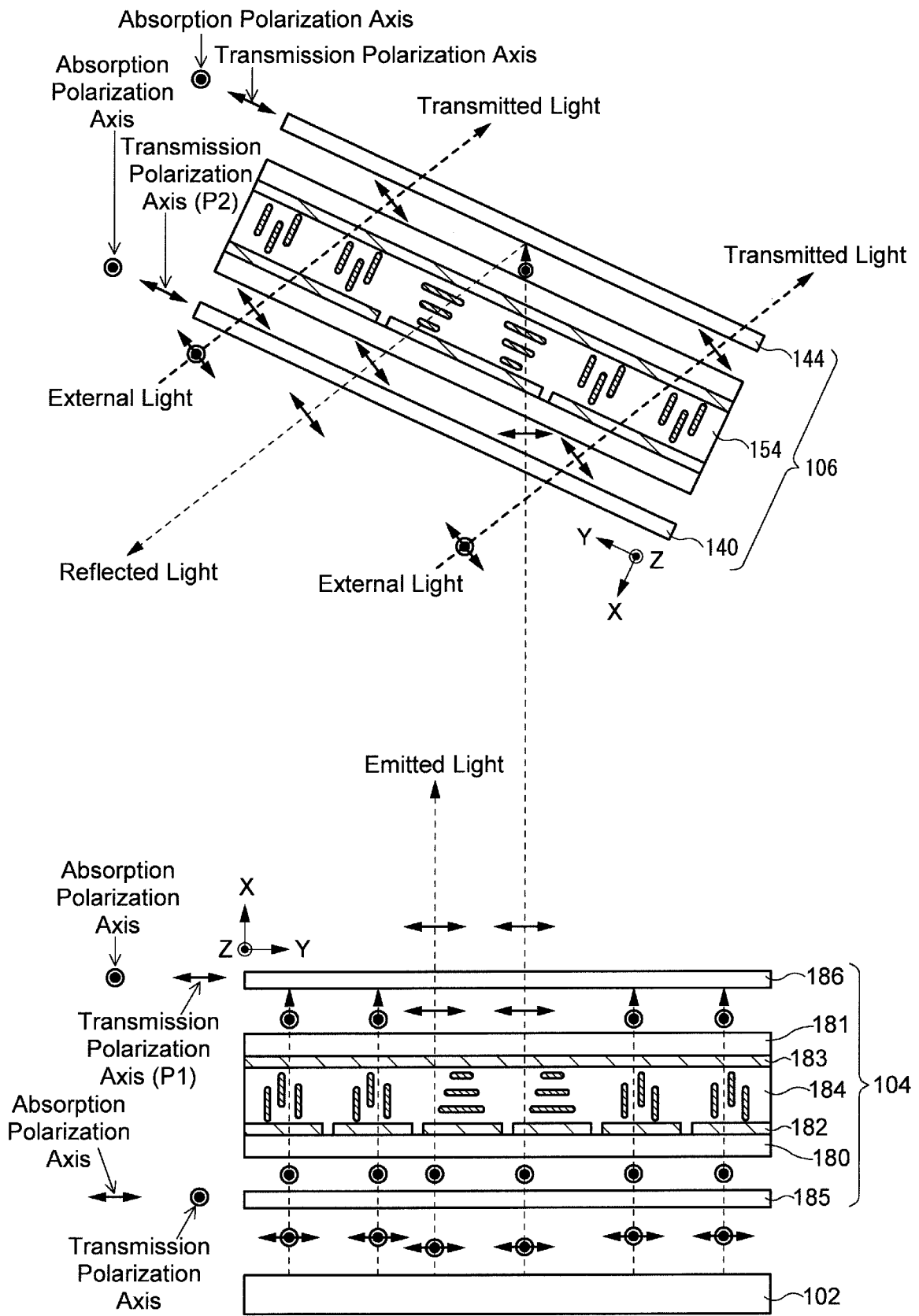
FIG. 6 shows details of a display panel and a reflective panel applied to a display system according to an embodiment of the present invention.

FIG. 6 shows an example of the display panel 104 and the reflective panel 106 on which the image of the display panel 104 is projected. The display panel 104 includes the liquid crystal panel in which a liquid crystal layer 184 is disposed between a substrate 180 arranged with a plurality of pixel electrodes 182 and a substrate 181 arranged with counter electrodes 183, and a first polarization plate 185 located at the backlight 102, and a second polarization plate 186 located at the backlight 102 and the reflective side. The first polarization plate 185 and the second polarization plate 186 are linear polarization plates and are disposed so that their polarization axes are orthogonal (cross-Nicol arrangement).

FIG. 6 shows a state in which some of the pixel electrodes of the plurality of pixel electrodes 182 are turned on in the display panel 104 and the polarized light of the backlight 102 is not transmitted (a state in which the image is not displayed), and the polarized light is transmitted through the other parts of the pixel electrode region (a state in which the image is displayed). That is, FIG. 6 shows a state in which the transmission polarization axis of the first polarization plate 185 is disposed in the second direction (perpendicular direction), the transmission polarization axis of the second polarization plate 186 is disposed in the first direction (vertical direction), and the polarization axis of light passing through the liquid crystal layer 184 in a region where voltage is not applied to the pixel electrode 182 is rotated by 90 degrees and passes through the second polarization plate 186.

The reflective panel 106 is located at a position where the image displayed on the display panel 104 is projected. The reflective panel 106 shown in FIG. 6 has the same structure as the reflective panel shown in FIG. 3A. The image projected by the display panel 104 is formed by light passing through the second polarization plate 186. The light passing through the second polarization plate 186 is the light polarized in the first direction. Therefore, the transmission polarization axes of the absorption polarization unit 140 of the reflective panel 106 are arranged so that the transmission polarization axes of the second polarization plate 186 coincide with each other. In other words, the transmission polarization axis of the absorption polarization unit 140 in the YZ plane is also arranged in a direction parallel to the Y direction, when the transmission polarization axis of the second polarization plate 186 in the YZ plane (plane based on the X, Y and Z directions shown in the figure) is arranged in a direction parallel to the Y direction. That is, the transmission polarization axes are arranged in the same direction in the respective YZ planes, when the main surfaces of the second polarization plate 186 and the absorption polarization unit 140 are in the YZ plane. This arrangement of transmission polarization axes allows the reflective panel 106 to reflect the projected image. The X axis of the reflective panel and the X axis of the display panel are located on the same plane (on the same XY plane), and the YZ plane of the reflective panel and the YZ plane of the display panel are perpendicular to the XY plane.

As shown in FIG. 6, when the image displayed on the display panel 104 includes polarized light, it is preferable that the transmission polarization axis of the absorption polarization unit 140 of the reflective panel 106 is aligned with the polarization axis of the polarized light. On the other hand, although not described in detail with reference to the figures, the reflective panel 106 reflects a component of light which is flat on the transmission polarization axis of the absorption polarization unit 140, and reflects the image to the magnifying mirror 108 in the same manner as described above, when the image displayed by the display panel 104 is non-polarized light.

Although the present embodiment shows the case where the display panel 104 is the liquid crystal panel, one embodiment of the present invention is not limited to the liquid crystal panel, and the display panel using the organic electroluminescent element (OLED), the display panel using the mini LED (Light Emitting Diode) or the micro LED can be applied.

4. Backlight

An edge-type backlight and a direct-type backlight may be applied as the backlight. It is preferable to use a backlight which is a direct type and can be partially driven (local dimming). The contrast may be improved by using a partially drivable backlight so that only a part necessary for display is lighted and the other parts are not lighted. Further, as will be described later, the partial drive control circuit is preferably linked to the control of the reflection region of the reflective panel 106. Thus, it is possible to suppress the temperature increase of the display panel 104 due to condensing of the external light.

5. Functional Configuration of the Display System

Figure 7:
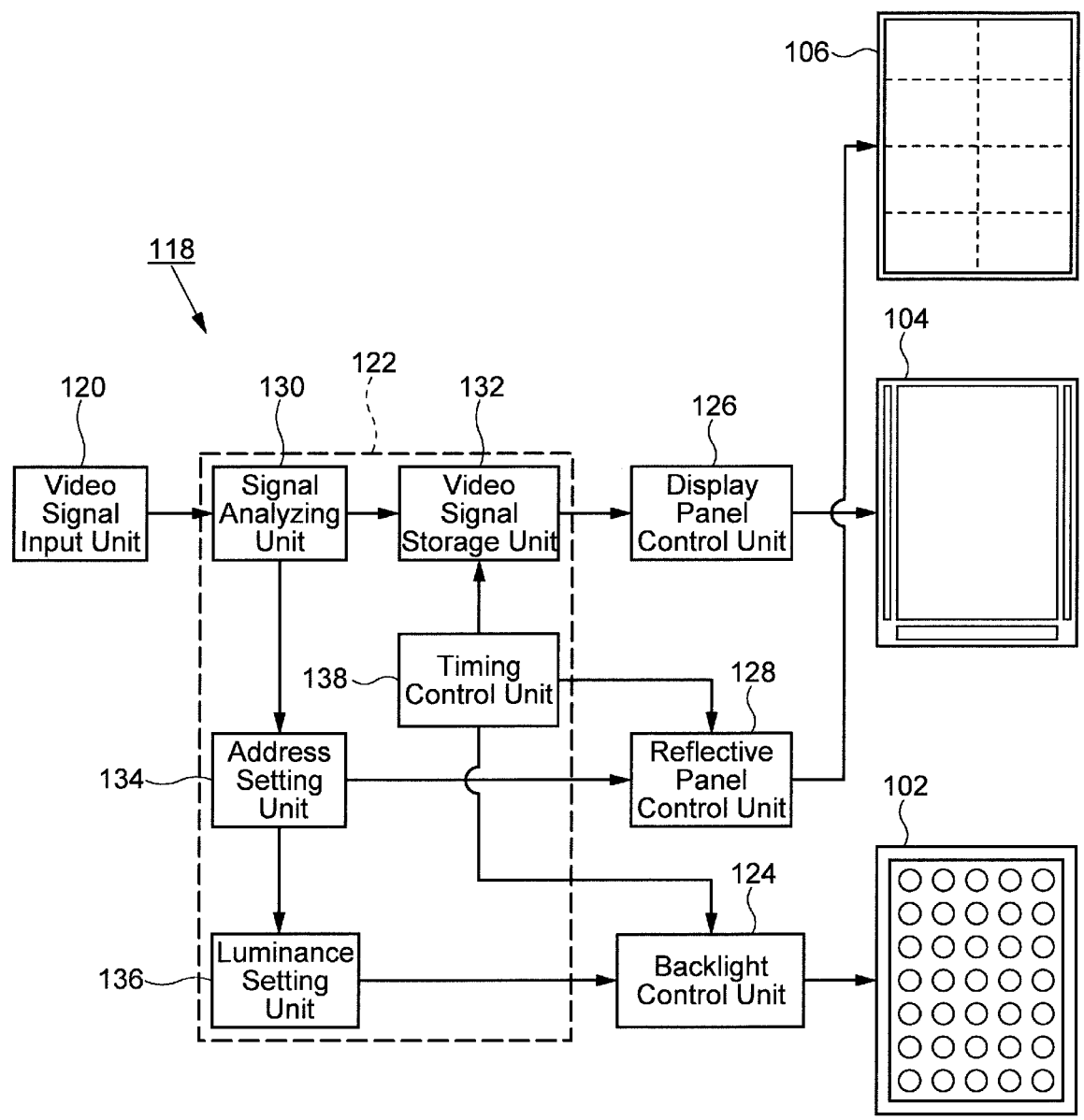
FIG. 7 is a block diagram showing a functional configuration of a display system according to an embodiment of the present invention.

FIG. 7 shows a functional configuration of a control system 118 in the display system 100. The control system 118 includes a video signal input unit 120, a control unit 122, a backlight control unit 124, a display panel control unit 126, and a reflective panel control unit 128. The backlight control unit 124 outputs signal to control the on and off function of the backlight 102, to control the partial drive, and to control the light intensity when the backlight is turned on. The display panel control unit 126 controls display of the image on the display panel 104. The reflective panel control unit 128 controls the formation of the reflection region and the transmission region in the light receiving surface of the reflective panel 106. This control is performed so as to be linked with the lighting region of the plurality of light emitting elements (light sources) when the backlight 102 is partially driven. LEDs or the like are used as the plurality of light emitting elements (light sources).

The control system 118 processes the video signal in the control unit 122 when the video signal is input to the video signal input unit 120, and the backlight control unit 124, the display panel control unit 126, and the reflective panel control unit 128 operate in cooperation with each other. FIG. 7 shows an example in which the control unit 122 includes a video signal analyzing unit 130, a video signal storage unit 132, an address setting unit 134, a luminance setting unit 136, and a timing control unit 138.

The video signal input to the video signal input unit 120 is input to the video signal analyzing unit 130. The video signal analyzing unit 130 receives, for example, video signals for one frame. The video signal analyzing unit 130 specifies a region where the image is displayed in one frame. The video signal analyzing unit 130 performs signal processing to obtain a signal suitable for driving the display panel 104, and outputs the signal to the video signal storage unit 132. The video signal storage unit 132 temporarily stores video signals in predetermined units (for example, one frame) that have been processed by the video signal analyzing unit 130.

The video signal analyzing unit 130 outputs information specifying a region in which the image is displayed in one frame to the address setting unit 134. The address setting unit 134 sets the addresses (regions for lighting the light emitting elements) of the plurality of light emitting elements (light sources) of the backlight 102 corresponding to regions in which images are displayed in one frame. The address setting unit 134 sets an address (reflection region) of the reflective panel 106 corresponding to a region where the image is displayed in one frame. Alternatively, the address setting unit 134 sets the address (reflection region) of the reflective panel 106 corresponding to the lighting address of the backlight 102. The addressing process in the address setting unit 134 may be performed by a table for associating the screen address of one frame with the divided region of the backlight 102 and the divided region of the reflective panel 106.

The luminance setting unit 136 sets the luminance of the lighting region of the backlight 102 based on the video signal of the region where the image is displayed in one frame. For example, the luminance setting unit 136 controls the duty ratio of the pulse drive based on the gradation data included in the video signal when the backlight 102 is driven by PWM control. The timing control unit 138 controls the timing so that writing of the video signal to the display panel 104, lighting of the backlight 102, and control of the reflection region of the reflective panel 106 are linked.

Figure 8:
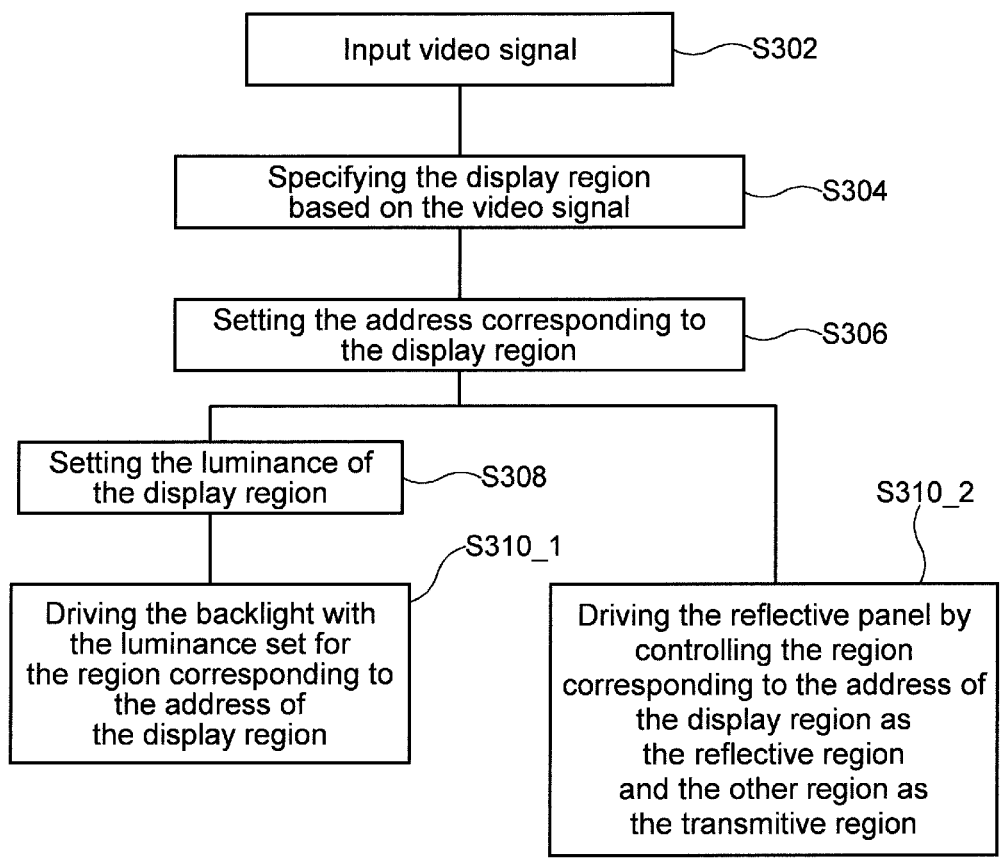
FIG. 8 is a flowchart for explaining a process performed by a control unit of a display system according to an embodiment of the present invention.

FIG. 8 is a flowchart showing the processing performed by the control unit 122. First, the video signal input unit 120 inputs the video signal to the control unit 122 (S302). The video signal is input to the control unit 122 in units of frames or lines. The input video signal specifies a region where the image is displayed in one frame (S304). This processing is performed by the function of the video signal analyzing unit 130. For example, when the image is displayed in a predetermined region with respect to a plain background (a transparent background when displayed on a head-up display), the predetermined region is specified. Thereafter, addresses of the plurality of light emitting elements (light sources) of the backlight 102 corresponding to the predetermined display region and addresses of the reflection region of the reflective panel 106 are set (S306). This processing is performed by the function of the address setting unit 134.

After the lighting addresses of the plurality of light emitting elements (light sources) of the backlight 102 are set, the luminance of the corresponding plurality of light emitting elements (light sources) is set (S308). The luminance is set based on the gradation data of the video signal. This processing is performed by the function of the luminance setting unit 136. The backlight 102 and the reflective panel 106 are driven based on the data set by the above processing (S310_1, S310_2).

Figure 9:
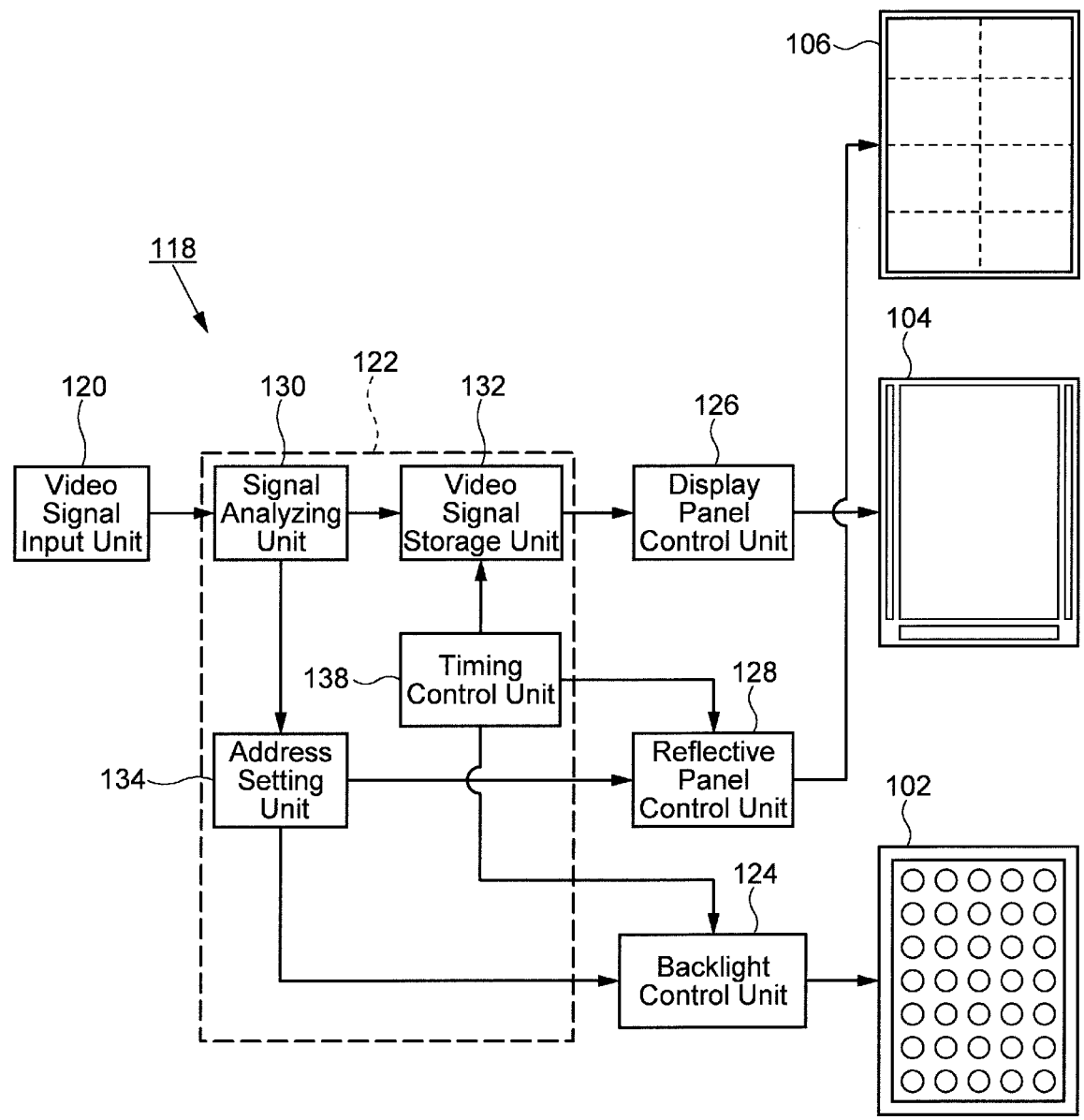
FIG. 9 is a block diagram showing a functional configuration of a display system according to an embodiment of the present invention.

FIG. 9 shows another configuration of the control system 118 in the display system 100. The control system 118 shown in FIG. 9 differs from the control system shown in FIG. 7 in that the luminance setting unit is not provided. That is, the control system 118 shown in FIG. 9 has a configuration in which the backlight 102 is simply turned on/off. Specifically, the lighting and non-lighting are controlled only in the region where the backlight 102 is set by the address setting unit 134. This control is performed by the timing control unit 138 in synchronization with the control of the reflection region of the reflective panel 106. It is also possible to drive the display system 100 with such a configuration.

Figure 10:
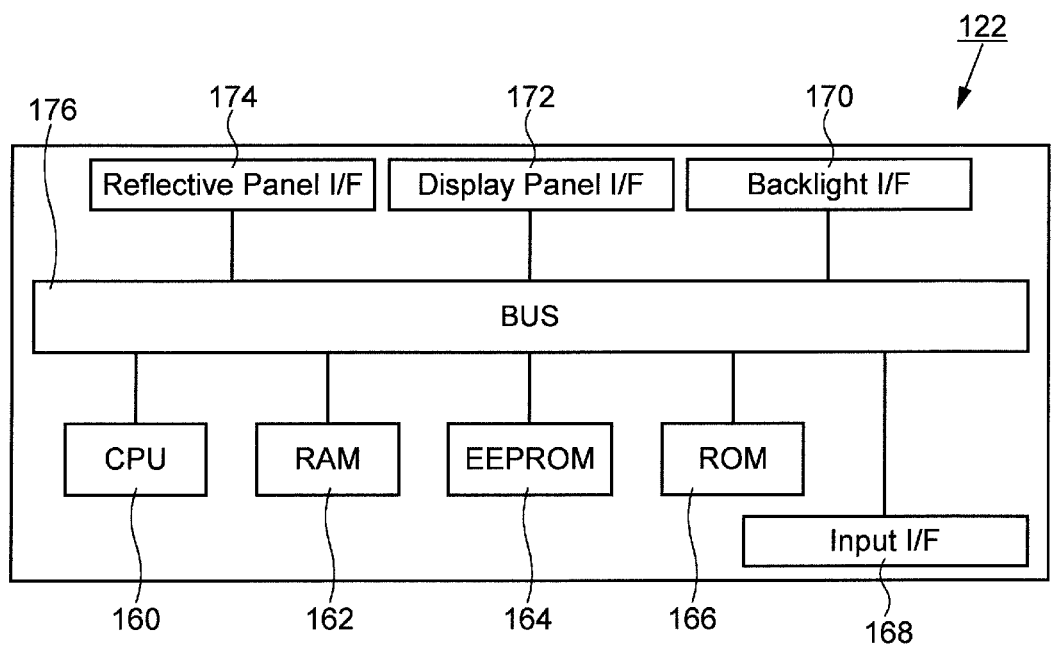
FIG. 10 shows a hardware configuration of a control unit of a display system according to an embodiment of the present invention.

FIG. 10 shows a hardware configuration of the control unit 122. The control unit 122 includes a CPU 160, a volatile memory (RAM) 162, a rewritable nonvolatile memory 164, a read only memory (ROM) 166, and the like. The control unit 122 includes an input interface 168, a backlight interface 170, a display panel interface 172, and a reflective panel interface 174. These devices are interconnected via a bus 176. The functions of the video signal analyzing unit 130, the address setting unit 134, and the luminance setting unit 136 shown in FIG. 7 are realized by the CPU 160 executing programs stored in the nonvolatile memory 164, and the functions of the video signal storing unit 132 are realized by the volatile memory 162. The video signal is input through the input interface 168, the control signal of the backlight control circuit is output through the backlight interface 170, the control signal of the display panel control circuit is output through the display panel interface 172, and the control signal of the reflective panel control circuit is output through the reflective panel interface 174.

The control unit 122 shown in FIG. 7 and FIG. 10 may be used to partially drive the backlight 102 and to set the reflection region of the reflective panel 106 to correspond to the region of the plurality of light emitting elements (light sources) lighted by the partial drive. It is possible for the reflective panel 106 to control the region necessary for displaying the image as the reflection region and the region other than the reflection region as the transmission region, thereby it is possible to reduce the amount of external light irradiated on the display panel even when external light is incident.

6. Operating Mode of the Display System

The display system 100 according to an embodiment of the present invention may be driven by a combination of with or without partial driving (local dimming) of the backlight 102 and the control of the reflective and transmission regions of the reflective panel 106. Table 1 shows the operation modes that the display system 100 may select. The display system 100 may be driven by setting the following modes of operation.

TABLE 1

| | | Reflective Panel Control of Full Transmission State | | | |
|---|---|---|---|---|---|
| | | Without Partial Reflection Control | | With Partial Reflection Control | |
| Driving Method | | With | Without | With | Without |
| Back-light | Partial Driving | Mode A1 | Mode B1 | Mode C1 | Mode D1 |
| | Full Driving | Mode A2 | Mode B2 | Mode C2 | Mode D2 |

Table 1 shows that partial driving and full driving may be selected as the driving method of the backlight 102. The partial driving method is a driving method for partially lighting the plurality of light emitting elements (light sources) corresponding to the region where the image is displayed, and the full driving method is a driving method for lighting all of the plurality of light emitting elements (light sources) regardless of the display region of the image. As a driving system of the reflective panel 106, the control of the entire transmissive state is a driving method in which a period for making the entire surface of the light receiving surface transmissive is provided in one frame, and the partial reflection control is a driving method in which a part of the light receiving surface is the reflection region and the other region is the transmission region corresponding to the display region of the image. Table 1 classifies modes A1, A2, modes B1, B2, modes C1, C2, and modes D1, D2 according to the drive methods of the backlight 102 and the reflective panel 106, and shows that the display system 100 may be driven in at least eight modes.

Figure 11A:
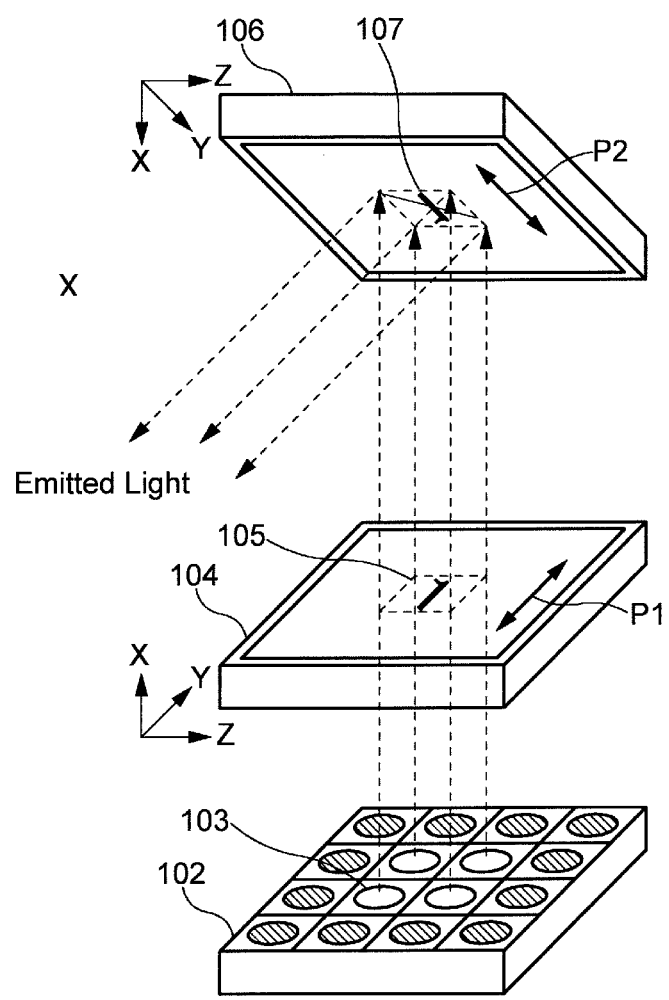
FIG. 11A shows an operating state of a mode A1 of a reflective panel applied to a display system according to an embodiment of the present invention.

FIG. 11A is a schematic diagram illustrating the operation of the mode A1. The mode A1 is controlled so that the backlight 102 is partially driven and the reflective panel 106 partially forms the reflection region. FIG. 11A shows a state in which the image is displayed on the central part of the display panel 104 (an image display region 105), the plurality of light emitting elements (light sources) in the central region of the backlight 102 are lighted corresponding to the display region (a lighting region 103), and the light receiving surface of the reflective panel 106 corresponding to the lighting region is controlled so as to form a reflection region 107 and the other region forms a transmission region. At this time, as described with reference to FIG. 6, the transmission polarization axis P1 of the polarization plate (the second polarization plate 186) on the emission side of the display panel 104 and the transmission polarization axis P2 of the incident surface (the absorption polarization unit 140) of the reflective panel 106 are aligned. In other words, when the transmission polarization axis in the YZ plane (the plane based on the X, Y and Z directions shown in the figure) of the polarization plate on the emission side of the display panel 104 is arranged in the direction parallel to the Y direction, the transmission polarization axis in the YZ plane of the incident plane (the absorption polarization unit 140) of the reflective panel 106 is also arranged in the direction parallel to the Y direction. Note that, in FIG. 11A, the X axis on the reflective panel side and the X axis on the display panel side may be located on the same plane (on the same XY plane). That is, the transmission polarization axis P1 of the polarization plate (the second polarization plate 186) on the emission side of the display panel 104 and the transmission polarization axis P2 of the incident surface (the absorption polarization unit 140) of the reflective panel 106 are also positioned on the XY plane.

Figure 12:
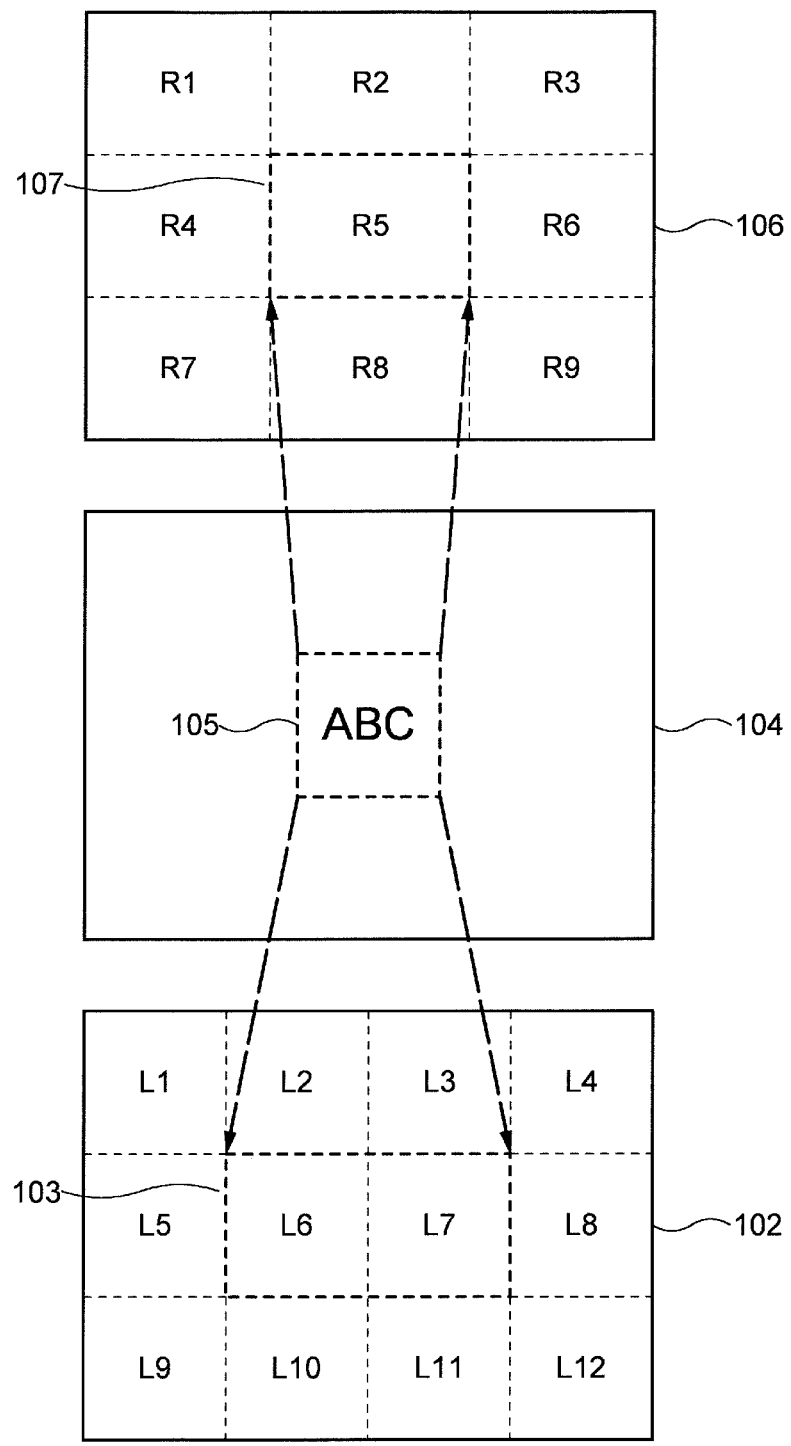
FIG. 12 schematically shows a relationship of a backlight, a display panel, and a reflective panel when a display system according to an embodiment of the present invention is driven in the mode A1

FIG. 12 schematically shows the relationships among the backlight 102, the display panel 104, and the reflective panel 106 when the display system 100 is driven in mode A1. When the image is displayed in a partial region of the display part of the display panel 104 (the image display region 105), the region of the regions L6, L7 corresponding to the image display region 105 of the partially driven backlight 102 becomes a lighting region 103. The reflective panel 106 has a region R5 corresponding to the lighting region 103 of the backlight 102 as the reflection region 107, and other regions (R1 to R4, R6 to R9) are controlled to be a transmission region.

Figure 13:
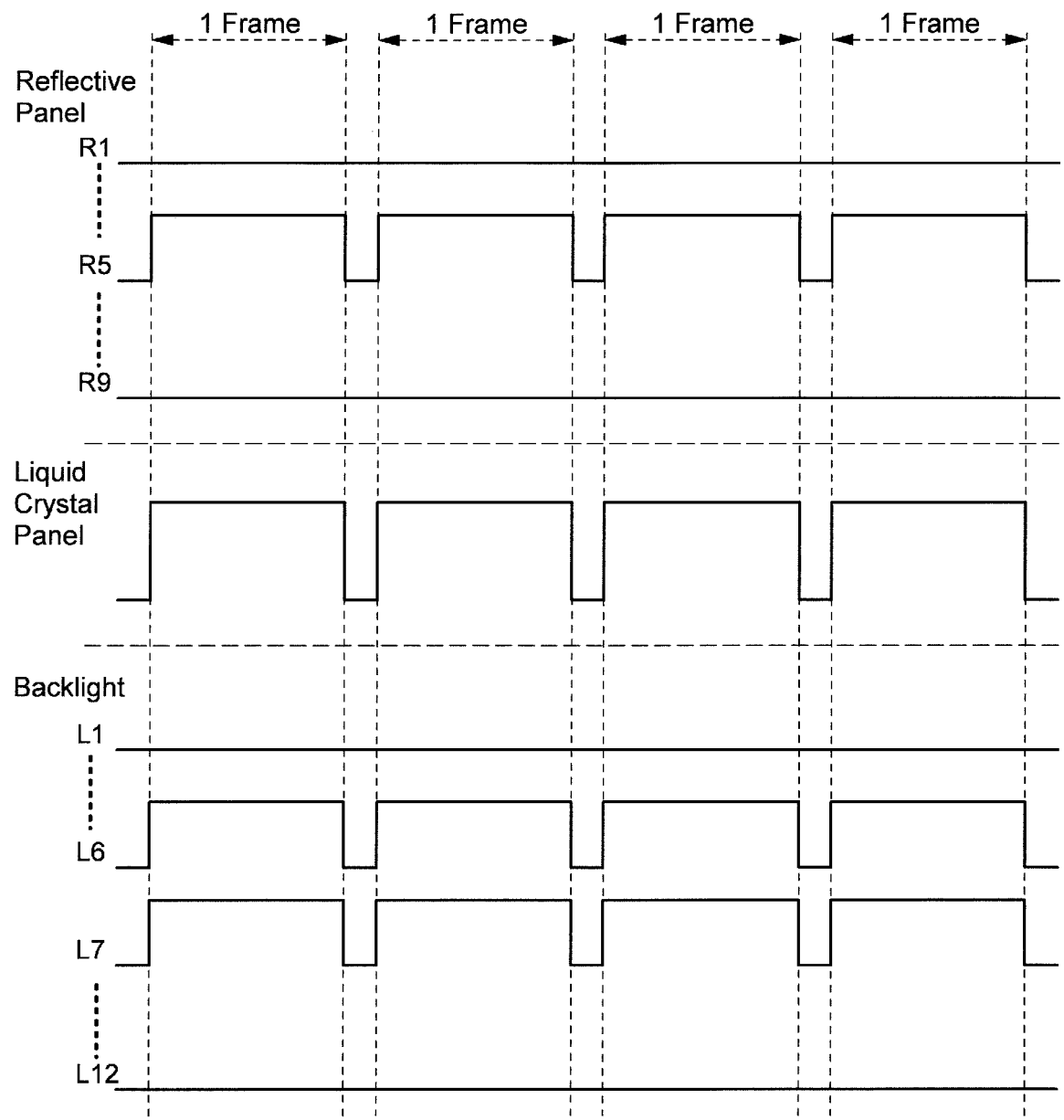
FIG. 13 shows a timing chart in which a display system according to an embodiment of the present invention operates in the mode A1

FIG. 13 shows a timing chart for explaining the operation of the mode A1. The backlight 102, the display panel 104 and the reflective panel 106 operate synchronously. FIG. 13 shows an example in which the light emitting region of the backlight 102 is divided into L1 to L12 and the reflective panel 106 is divided into R1 to R9. The backlight 102 and the reflective panel 106 operate in synchronization with the frame frequency, when the display panel 104 is driven at a predetermined frame frequency.

As illustrated in FIG. 12, when the display panel 104 displays the image in one region (the image display region 105) of the display part, the backlight 102 is driven so that the light emitting regions (L6, L7) corresponding to the image display region 105 emit light and the other regions do not emit light. In addition, in FIG. 13, the reflective panel 106 controls the predetermined region R5 as the reflection region and controls other regions (R1 to R4, R6 to R9) as the transmission region in synchronization with the light emitting region of the backlight 102. It is possible to dynamically change the light emitting region of the backlight 102 and the reflection region of the reflective panel 106 according to the region in which the image is displayed on the display panel 104, since the light emitting region of the backlight 102 and the reflection region of the reflective panel 106 are changeable for each frame.

Figure 11B:
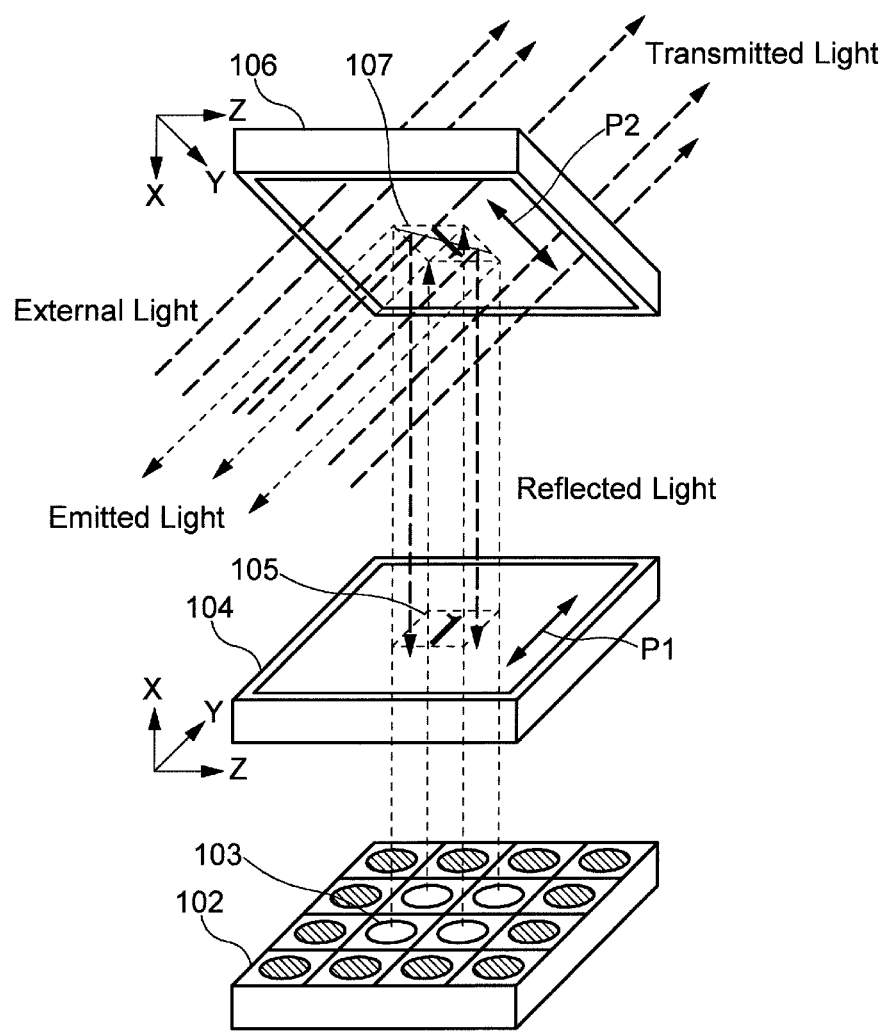
FIG. 11B shows the influence of incident external light in the mode A1 of a reflective panel applied to a display system according to an embodiment of the present invention.

FIG. 11B shows a state in which external light enters the reflective panel 106 in the mode A1. Since the reflective panel 106 is controlled by the reflection region 107 and the peripheral transmission region, the external light incident on the transmission region passes through the reflective panel 106, and the external light incident on the reflection region 107 is reflected to the display panel 104 side. As is apparent from the comparison with FIG. 4A, the operation of the mode A1 can reduce the amount of external light irradiated on the display panel 104 and suppress a temperature increase of the display panel 104. The advantageous effect of the mode A1 shown in FIG. 11B may be obtained in the same manner in the mode A2 in which the entire backlight 102 is lighted.

Figure 14A:
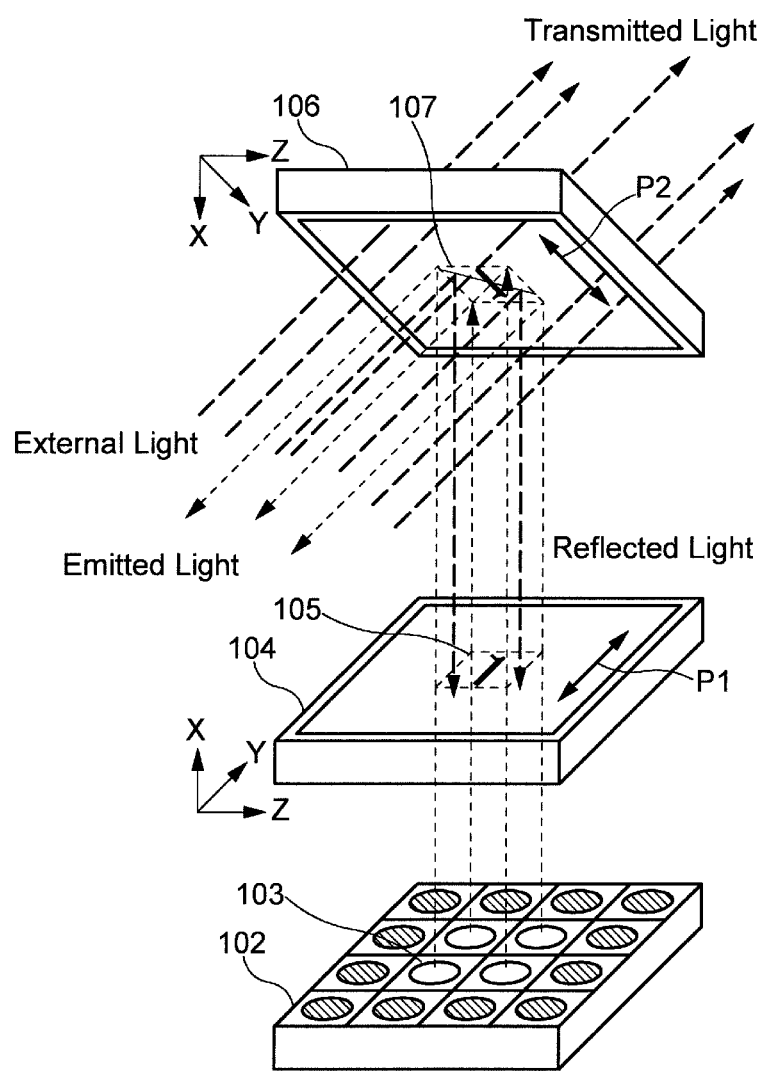
FIG. 14A shows an operating state of a mode C1 of a reflective panel applied to a display system according to an embodiment of the present invention.
Figure 14B:
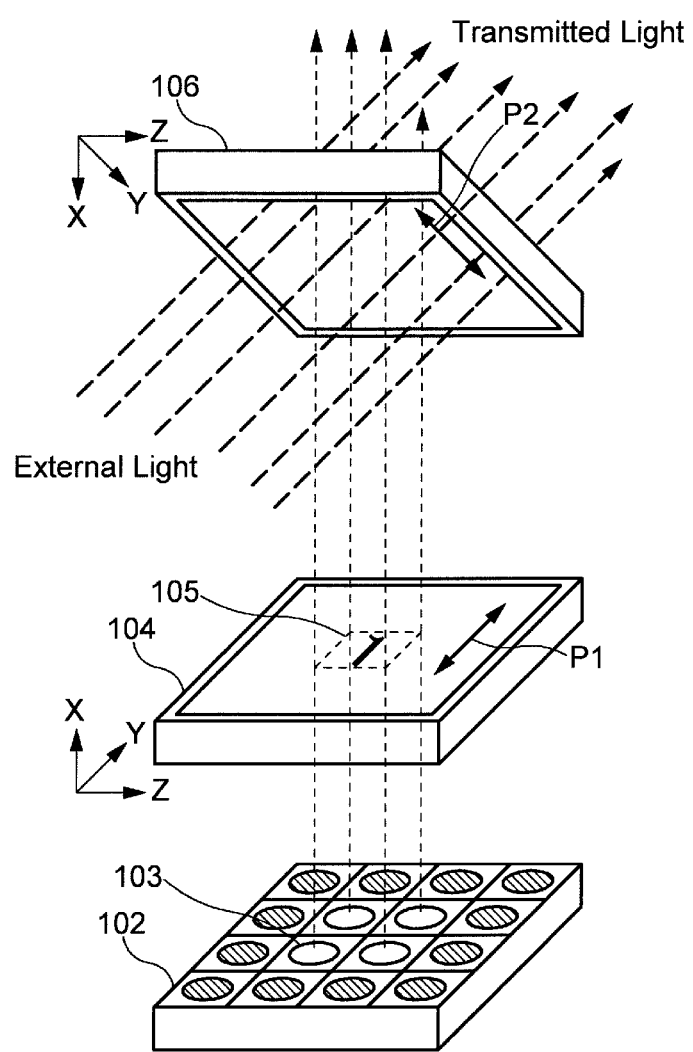
FIG. 14B shows the influence of incident external light in the mode C1 of a reflective panel applied to a display system according to an embodiment of the present invention.

FIG. 14A and FIG. 14B are schematic diagrams illustrating the operation of the mode C1. The mode C1 is the same as the mode A1 in that the backlight 102 is partially driven and the reflective panel 106 is partially controlled to form the reflection region 107 in a fixed period of one frame. The mode C1 differs from the mode A1 in that the reflective panel 106 does not maintain the reflective state for the entire period of one frame period, but maintains the reflective state only for a predetermined period of one frame, and changes to the transmissive state for other periods.

Figure 15:
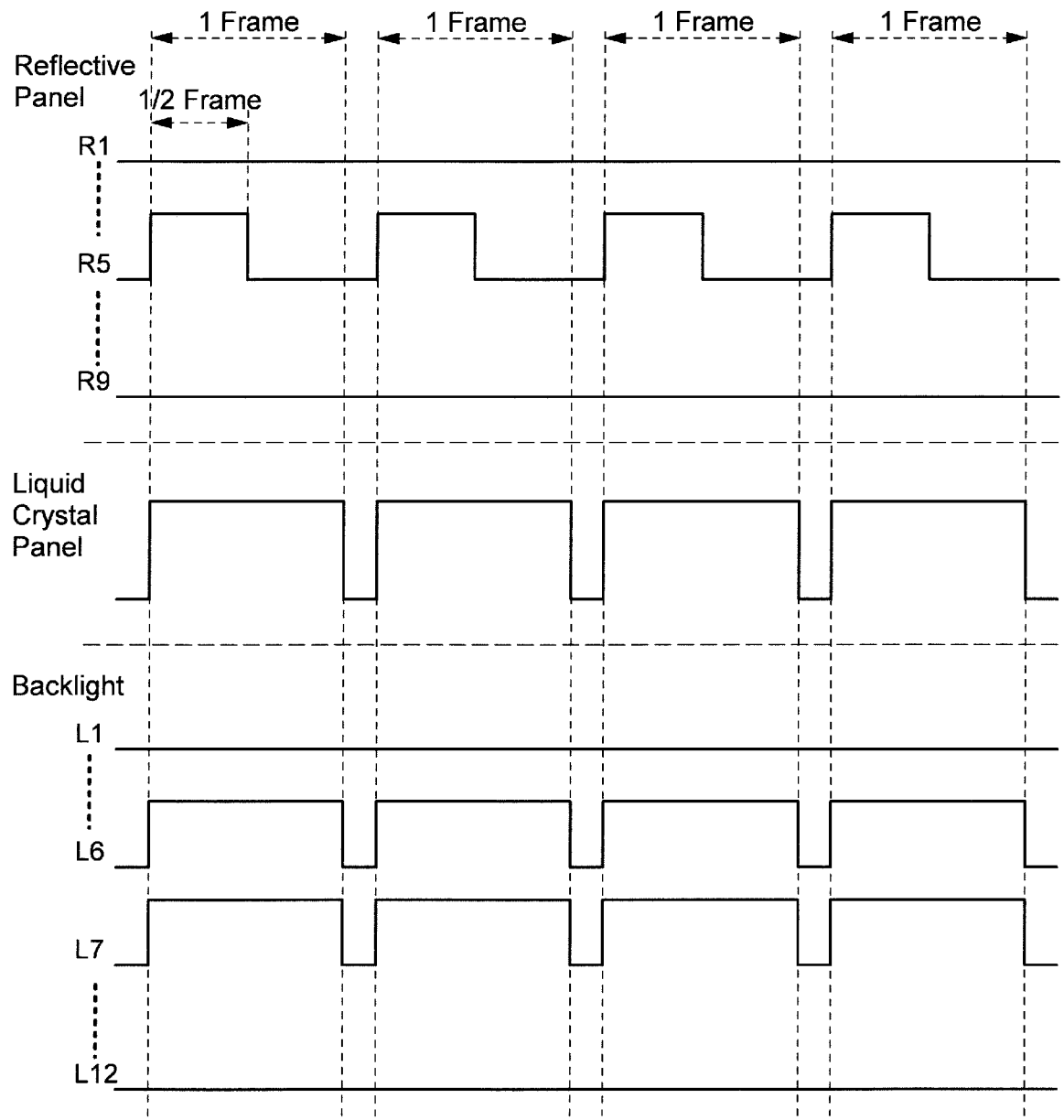
FIG. 15 shows a timing chart of a display system according to an embodiment of the present invention in an operation mode C1

FIG. 15 shows a timing chart for explaining the operation of the mode C1. FIG. 15 shows a mode in which the light emitting regions L6 and L7 of the backlight 102 are lighted at the same frame frequency in synchronization with the display panel 104, and the reflective panel 106 controls the reflection region 107 to a reflective state for a predetermined period (for example, ½ frame period) of one frame, and controls the remaining period to the transmissive state. The length of the period during which the reflective state is maintained in one frame in the operation of the reflective panel 106 is arbitrary and can be set appropriately within a range that does not affect the visibility of the image.

As shown in FIG. 14A, when external light is incident, a part of the external light is reflected by the reflection region 107 in a certain period of one frame, and the display panel 104 is irradiated with the external light. On the other hand, since the entire surface of the light receiving surface of the reflective panel 106 is the transmission region except for the certain period of one frame, the external light is not reflected and the display panel 104 is not irradiated with the external light. Even if the image is displayed on the display panel 104, the image is not displayed because it is not reflected by the reflective panel 106. In this way, the integrated light quantity of the external light irradiated to the display panel 104 can be reduced by providing a period in which the entire surface of the light receiving surface of the reflective panel 106 becomes the transmission region within one frame period. Since the frame frequency of the display panel is 60 Hz or higher, even if a non-display period as shown in FIG. 14B is provided, a user cannot see it. It is also possible to obtain the advantageous effect of the mode C1 shown in FIG. 14B in the same manner in the mode C2 in which the entire backlight 102 is illuminated.

The light quantity of external light emitted to the display panel 104 can be reduced just by setting the reflective panel 106 in the whole surface transmissive mode for a predetermined period of one frame (the modes D1, D2).

Figure 16:
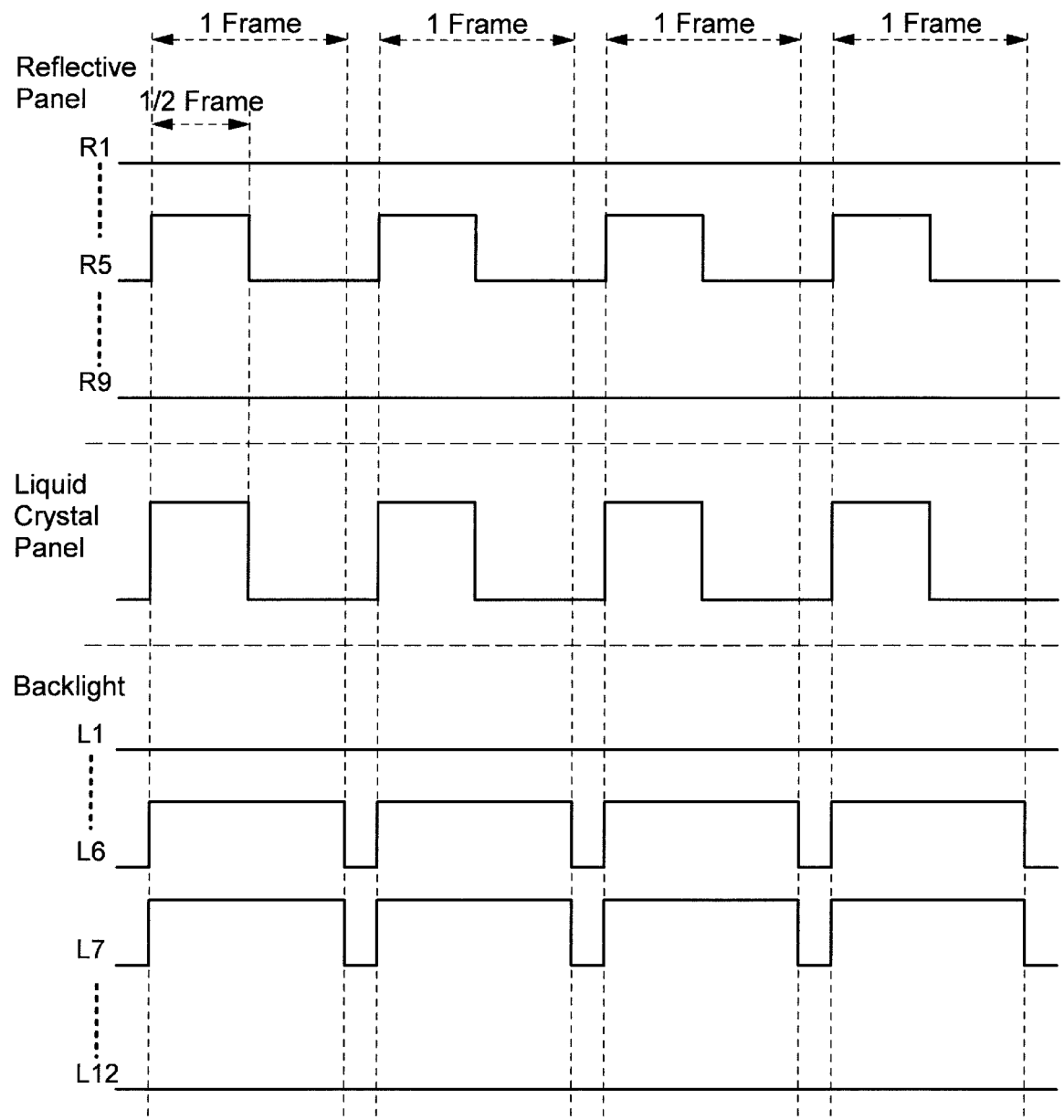
FIG. 16 shows a timing chart of a display system according to an embodiment of the present invention in an operation mode C1
Figure 17:
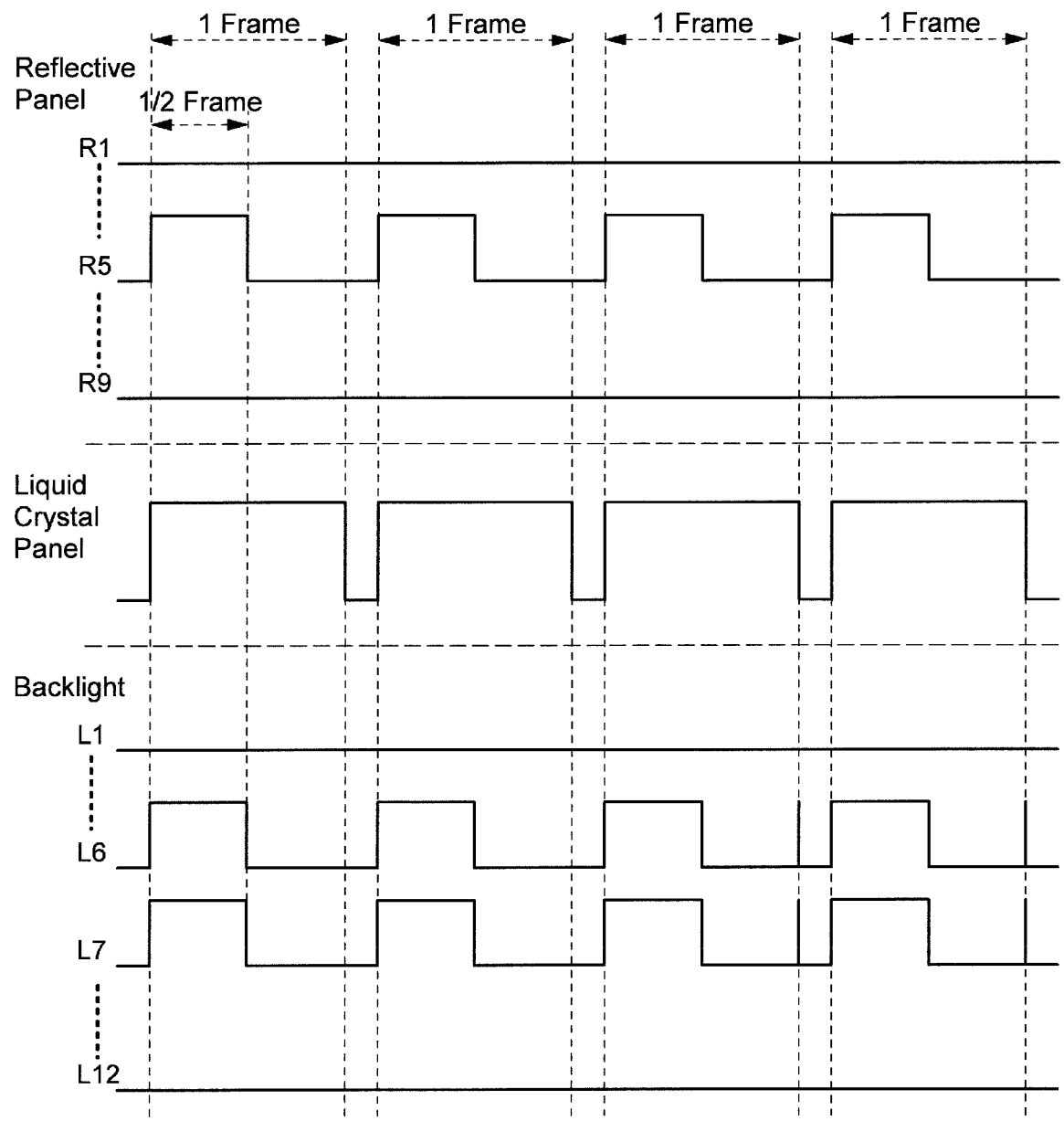
FIG. 17 shows a timing chart of a display system according to an embodiment of the present invention in an operation mode C1
Figure 18:
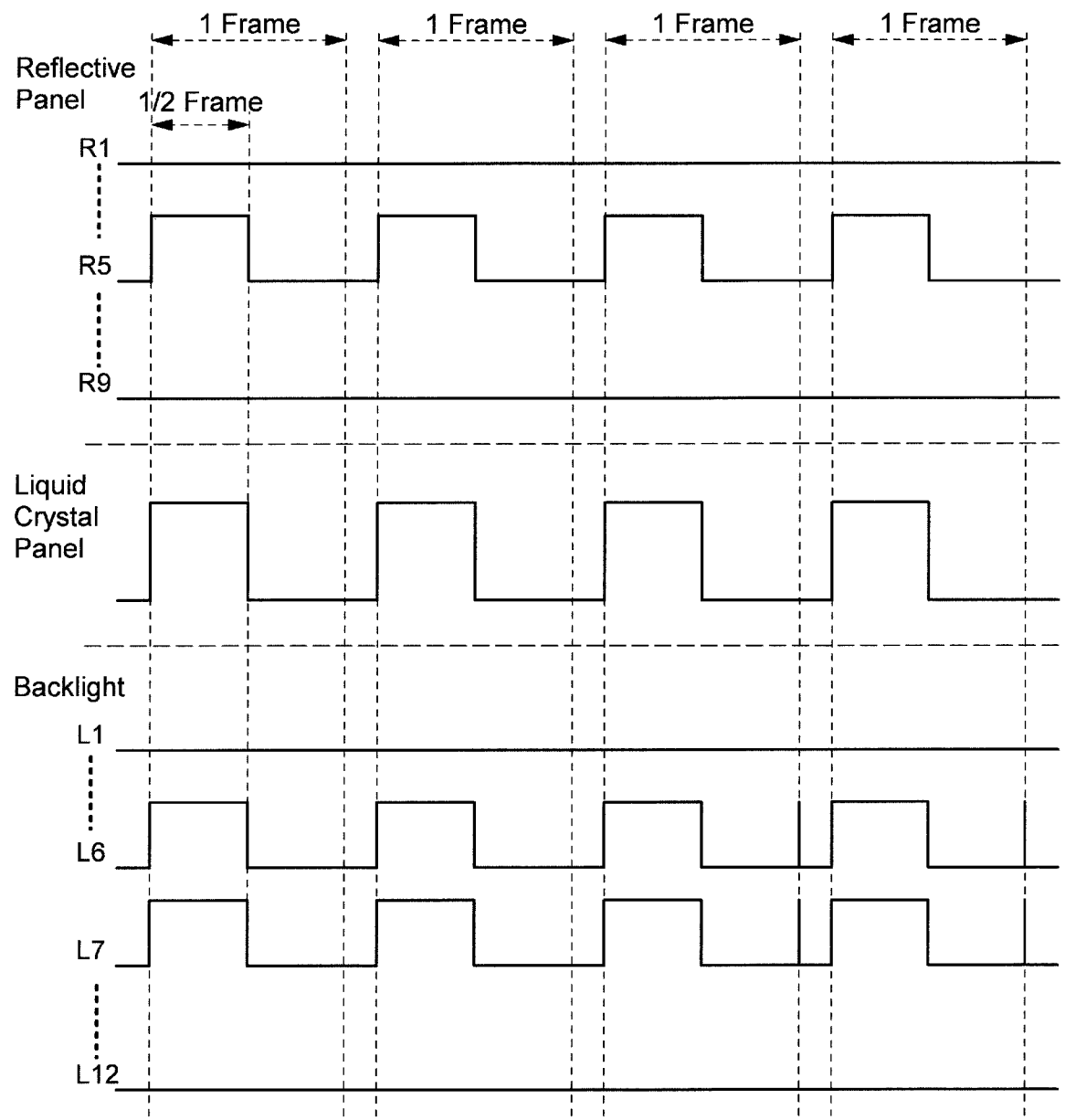
FIG. 18 shows a timing chart of a display system according to an embodiment of the present invention in an operation mode C1 and FIG. 19 schematically shows a configuration of a display system according to an embodiment of the present invention.

FIG. 16 is a timing chart for explaining the operation of the mode C1, and shows an operation in which the display panel 104 displays the image for a predetermined period (½ frame period) of one frame in synchronization with the reflective panel 106, and does not display the image for the remaining frame period. FIG. 17 shows a timing chart of the mode C1, and shows an operation in which the backlight is lighted for a predetermined period (½ frame period) of one frame in synchronization with the reflective panel 106, and the backlight 102 is not lighted for the remaining frame period. FIG. 18 shows an example of another timing chart of the mode C1, and shows an operation in which the display panel 104 displays the image for a predetermined period (½ frame period) of one frame in synchronization with the reflective panel 106, and the backlight 102 is turned on, and the image is not displayed, and the backlight is not turned on for the remaining frame period. According to this operation, it is possible to suppress a temperature increase of the display panel 104 and to reduce the power consumption of the display system 100.

According to one embodiment of the present invention, it is possible to reduce the intensity and quantity of external light irradiated on the display panel 104 even when external light is incident by dividing the light receiving surface of the reflective panel 106 into a plurality of regions and setting the reflection region and the transmission region for each divided region. It is possible to increase the contrast of the image to be displayed (virtual image to be viewed) by synchronizing the reflection region formed on the reflective panel 106 with partial driving (local dimming) of the backlight, and to reduce the intensity and the quantity of external light to be emitted to the display panel 104. It is possible to suppress a temperature increase of the display panel 104 and to prevent the temperature from exceeding the transition temperature of the liquid crystal, with such a function of the reflective panel 106. Thus, it is possible to obtain the display system with improved display quality and reliability.

Figure 19:
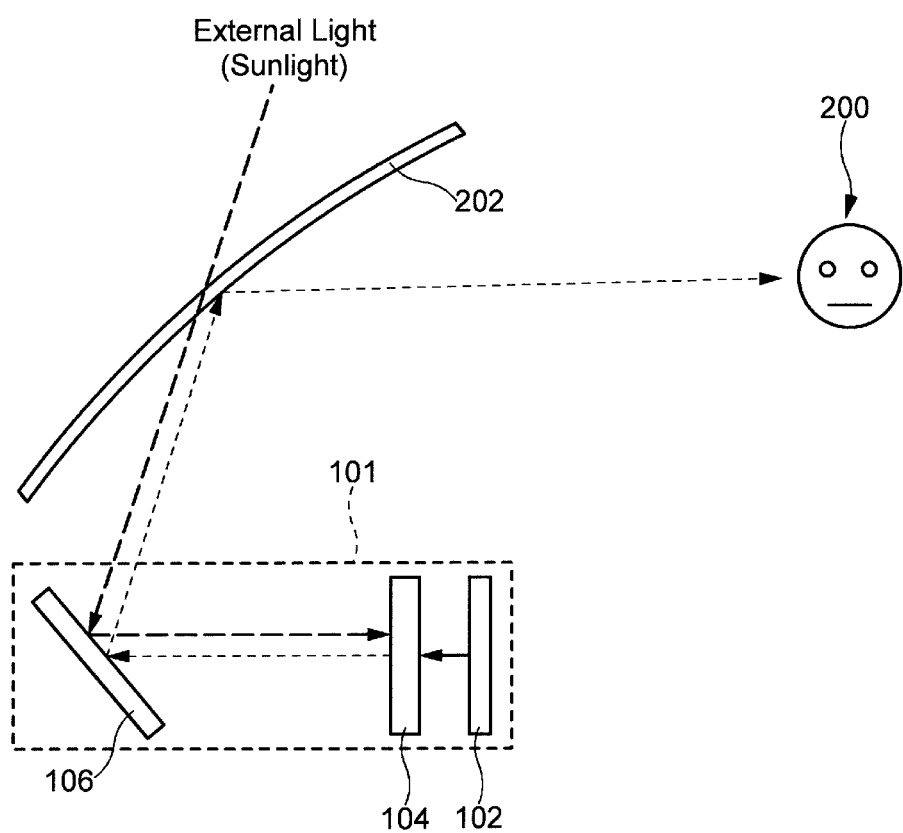

Although the configuration of the display system 100 shown in FIG. 1 is mainly described above, one embodiment of the present invention is not limited thereto, and can be applied to a display system having other configurations. For example, as shown in FIG. 19, the present invention can be applied to a display system 101 in which the image of the display panel 104 is projected onto the reflective panel 106 and the reflective panel 106 projects the image onto the windshield 202. The reflective panel 106 is configured so that the reflection region and the transmission region in the display system 101 are dynamically controllable, thereby suppressing the incidence of external light on the display panel 104 and improving reliability.

The embodiments described above as one embodiment of the present invention may be implemented in any combination as appropriate, so long as they do not contradict each other. Also, those in which a person skilled in the art has added, deleted, or altered the design of components, or has added, omitted, or altered the conditions based on the configuration shown in the embodiment, are included in the scope of the present invention as long as they have the gist of the present invention.

It is to be understood that other effects different from those provided by the embodiments described above, which are obvious from the description of the present embodiment or can be easily predicted by a person skilled in the art, are provided by one embodiment of the present invention.

What is claimed is:

1. A display system, comprising:
a display panel;
a backlight located at a back surface side of the display panel and that emits light toward the display panel;
a reflective panel located at a front surface side of the display panel and having a light receiving surface inclined obliquely in a direction perpendicular to an optical axis of the backlight; and
a magnifying mirror disposed at a position where a reflected light from the reflective panel is received,
wherein the reflective panel includes a reflection region and a transmission region in the light receiving surface, and a position and a size of the reflection region and the transmission region are variable.

2. The display system according to claim 1, wherein the reflective panel allocates a region where an image displayed on a part of a display part of the display panel is projected as the reflection region.

3. The display system according to claim 1, wherein the light receiving surface of the reflective panel includes a plurality of divided regions where a reflective state and a transmissive state are individually controlled.

4. The display system according to claim 3, wherein the backlight has a plurality of divided light emitting regions, and light emission/non-light emission of the plurality of divided light emitting regions is individually controlled, and
the plurality of divided regions of the reflective panel are controlled to be in the reflective state in a first region corresponding to the light emitting region of the plurality of divided light emitting regions, and are controlled to be in the transmissive state in a second region corresponding to the non-light emitting region of the plurality of divided light emitting regions.

5. The display system according to claim 1, wherein the reflection region includes:
a transmission polarization axis conversion unit including a plurality of first electrodes, a second electrode opposed to the plurality of first electrodes, and a liquid crystal layer between the plurality of first electrodes and the second electrode;
an absorption polarization unit located at a light incident side of the transmission polarization axis conversion unit; and
a reflection polarization unit located at a side opposite to the light incident side of the transmission polarization axis conversion unit,
wherein the transmission polarization axis of the absorption polarization unit and the reflection polarization axis of the reflection polarization unit are arranged to be perpendicular to each other.

6. A display system, comprising:
a display panel displaying images;
a backlight emitting light from a back surface side of the display panel;
a reflective panel having a light receiving surface on which an image displayed on the display panel is projected; and
a magnifying mirror for projecting the images projected on the reflective panel to a projection port,
wherein the reflective panel includes a reflection region and a transmission region in the light receiving surface, and a position and a size of the reflection region and the transmission region are variable.

7. The display system according to claim 6, wherein the reflective panel allocates a region where the image displayed on the display panel is projected as the reflection region.

8. The display system according to claim 6, wherein the reflective panel includes a first region and a second region in the light receiving surface, and a reflective state and a transmissive state of the first region and the second region are individually controlled.

9. The display system according to claim 6, wherein the backlight includes a plurality of light emitting elements which are division driven, and
the reflective panel controls a reflective state and a transmissive state of a first region and a second region in synchronization with the division driven plurality of light emitting elements.

10. The display system according to claim 9, wherein in the backlight, a part of the light emitting elements of the plurality of light emitting elements emits light corresponding to the image displayed on the display panel, and
the reflective panel is allocated with the reflection region in a region where the image is projected and is arranged with the transmission region in other regions.

11. The display system according to claim 6, wherein the reflective panel includes a pair of absorption polarization units and reflection polarization units, and a transmission polarization axis conversion unit disposed between the absorption polarization unit and the reflection polarization unit, and
the transmission polarization axis conversion unit controls the polarization axis of transmitted light by an electro-optical effect of liquid crystal.

12. The display system according to claim 6, wherein the reflective panel includes a period in which the entire light receiving surface is in a transmissive state within one frame period when the display panel displays the image.

* * * * *